US010972797B2

(12) United States Patent
Wang

(10) Patent No.: US 10,972,797 B2
(45) Date of Patent: Apr. 6, 2021

(54) SYSTEM, DEVICE AND METHOD FOR TRANSMITTING AND PLAYING INTERACTIVE VIDEOS

(71) Applicant: Kung-Cheng Wang, Taipei (TW)

(72) Inventor: Kung-Cheng Wang, Taipei (TW)

(*) Notice: Subject to any disclaimer, the term of this patent is extended or adjusted under 35 U.S.C. 154(b) by 0 days.

(21) Appl. No.: 15/979,015

(22) Filed: May 14, 2018

(65) Prior Publication Data
US 2018/0288483 A1 Oct. 4, 2018

(30) Foreign Application Priority Data

Mar. 14, 2017 (TW) .................. 106108344

(51) Int. Cl.
*H04N 21/472* (2011.01)
*H04N 21/262* (2011.01)
(Continued)

(52) U.S. Cl.
CPC ....... *H04N 21/472* (2013.01); *G06F 16/4387* (2019.01); *H04N 21/26258* (2013.01);
(Continued)

(58) Field of Classification Search
CPC ............... H04N 21/472; H04N 21/812; H04N 21/8456; H04N 21/47815; H04N 21/42227; H04N 21/8541; H04N 21/8545; H04N 21/4725; H04N 21/26258; H04N 21/478; H04N 21/4126; H04N 21/42212; H04N 21/42208; H04N 21/47202; H04N 21/4826; G06F 16/4387
See application file for complete search history.

(56) References Cited

U.S. PATENT DOCUMENTS 9,113,193 B1\* 8/2015 Gardes ............... H04N 21/4113
9,426,528 B2 8/2016 Kandanala et al.
(Continued)

FOREIGN PATENT DOCUMENTS

| JP | 2001-285837 | 10/2001 |
| JP | 2007-295584 | 11/2007 |
| TW | M410261 U | 8/2011 |

OTHER PUBLICATIONS

Japanese Patent Office, Office Action dated Apr. 2, 2019.
TIPO office action dated Nov. 14, 2017.

*Primary Examiner* — Michael R Telan
(74) *Attorney, Agent, or Firm* — Rabin & Berdo, P.C.

(57) ABSTRACT

A system, a device, and a method for transmitting and playing interactive videos are provided. The transmitting device includes a storing unit stored an interactive video and an interactive menu information, and a communicating unit transmitting the interactive video and the interactive menu information to a viewing end device. The interactive video includes one or more interactive segments. The frame of each interactive segment includes a plurality of interactive options. The interactive menu information includes a plurality of commands relative to the interactive options respectively. The viewing end device receives a control signal corresponding to one of color function keys of a remote controller, and executes the command associated with the interactive option on the frame of the interactive segment upon receiving the control signal.

21 Claims, 16 Drawing Sheets

(51) Int. Cl.
*H04N 21/478* (2011.01)
*G06F 16/438* (2019.01)
*H04N 21/81* (2011.01)
*H04N 21/845* (2011.01)
*H04N 21/422* (2011.01)
*H04N 21/8541* (2011.01)
*H04N 21/8545* (2011.01)
*H04N 21/4725* (2011.01)

(52) U.S. Cl.
CPC ..... *H04N 21/42227* (2013.01); *H04N 21/478* (2013.01); *H04N 21/4725* (2013.01); *H04N 21/47815* (2013.01); *H04N 21/812* (2013.01); *H04N 21/8456* (2013.01); *H04N 21/8541* (2013.01); *H04N 21/8545* (2013.01)

(56) References Cited

U.S. PATENT DOCUMENTS 9,820,004 B1* 11/2017 Foerster ............... H04N 21/488
2009/0144772 A1* 6/2009 Fink ....................... G06Q 30/02
725/42

* cited by examiner

| Play Order | Interactive Segment Identifier | Interactive Video Identifier | Start Time | End Time | Interactive Option Color | Video Element Type | Video Element Identifier | Display Weighting |
|---|---|---|---|---|---|---|---|---|
| 1 | EP01-S01 | EP01 | 00:00:00:00 | 00.02.22.19 | Red | Role | AC06 | 100 |
| 1 | EP01-S01 | EP01 | 00:00:00:00 | 00.02.22.19 | Green | Role | AC11 | 100 |
| 1 | EP01-S01 | EP01 | 00:00:00:00 | 00.02.22.19 | Yellow | Merchandise | GD03 | 100 |
| 1 | EP01-S01 | EP01 | 00:00:00:00 | 00.02.22.19 | Blue | Location | LC01 | 100 |
| 2 | EP01-S02 | EP01 | 00.02.22.19 | 00.04.42.09 | Red | Role | AC07 | →0 |
| 2 | EP01-S02 | EP01 | 00.02.22.19 | 00.04.42.09 | Green | Role | AC04 | →0 |
| 2 | EP01-S02 | EP01 | 00.02.22.19 | 00.04.42.09 | Green | Role | AC03 | ←100 |
| 2 | EP01-S02 | EP01 | 00.02.22.19 | 00.04.42.09 | Green | Role | AC06 | 100 |
| 2 | EP01-S02 | EP01 | 00.02.22.19 | 00.04.42.09 | Yellow | Merchandise | GD02 | 100 |
| 2 | EP01-S02 | EP01 | 00.02.22.19 | 00.04.42.09 | Blue | Location | LC02 | 100 |
| 3 | EP01-S04 | EP01 | 00.05.04.07 | 00.05.40.11 | Red | Role | AC06 | 100 |
| 3 | EP01-S04 | EP01 | 00.05.04.07 | 00.05.40.11 | Green | Role | AC04 | 100 |
| 3 | EP01-S04 | EP01 | 00.05.04.07 | 00.05.40.11 | Yellow | Merchandise | GD01 | 20 |
| 3 | EP01-S04 | EP01 | 00.05.04.07 | 00.05.40.11 | Yellow | Merchandise | GD02 | 80 |
| 3 | EP01-S04 | EP01 | 00.05.04.07 | 00.05.40.11 | Blue | Location | LC02 | 100 |
| ... | ... | ... | ... | ... | ... | ... | ... | ... |

FIG. 12C

SYSTEM, DEVICE AND METHOD FOR TRANSMITTING AND PLAYING INTERACTIVE VIDEOS

CROSS-REFERENCE TO RELATED APPLICATION

This non-provisional application claims priority under 35 U.S.C. § 119(a) to Patent Application No. 106108344 filed in Taiwan, R.O.C. on Mar. 14, 2017, the entire contents of which are hereby incorporated by reference.

BACKGROUND

Related Field

The instant disclosure relates to a system for transmitting and playing interactive videos, in particular, to a system, device and method for transmitting and playing interactive videos.

Related Art

Currently, an approach to interact with the viewing audience of a television program is to interact via telephone calls, as the way used in a television shopping show. The audience may have to pay for the phone call. Or, the production cost of the shopping show will majorly increase if the television station pays for the incoming calls.

Therefore, some television programs introduce mobile phone applications to interact with their audience. For example, the audience would be allowed to vote for the favorite player in a competition show. However, it requires the show's application to be installed on the audience's mobile phones and the television station also have to develop and maintain different editions of applications for different mobile phone platforms with a major cost.

SUMMARY

Accordingly, an interactive video transmitting device is disclosed. The interactive video transmitting device comprises a storing unit and a communicating unit. The storing unit stores an interactive video and interactive menu information. The interactive video comprises at least an interactive segment. A frame of said interactive segment comprises a plurality of interactive options. Said interactive options illustrate colors corresponding to a plurality of color function keys on a remote controller. The interactive menu information comprises a plurality of commands respectively corresponding to the interactive options of the interactive segment at each time point in a timeline of the interactive video. The communicating unit transmits the interactive video and the interactive menu information. When playing the interactive video on a viewing end device, the viewing end device receives a control signal corresponding to one of the color function keys on the remote controller, and according to the in-play interactive segment upon receiving the control signal, executes one of the commands corresponding to the corresponded one of the interactive options illustrated on the in-play interactive segment with the corresponded color as the one of the color function keys on the remote controller.

In an embodiment of the interactive video transmitting device, the interactive options corresponding to one of the interactive segments forms a hierarchical menu. When one of the interactive options is triggered, a next layer of the interactive options corresponding to the color function keys is displayed.

In an embodiment of the interactive video transmitting device, one of the commands is associated with an object displayed on the frame of the interactive segment, and the viewing end device stores a merchandise information corresponding to the object in a temporary area.

In another embodiment, an interactive video transmitting device is provided. The interactive video transmitting device comprises: a processor; a storing unit, electrically connecting with processor and storing a program code and a plurality of interactive videos, each of the interactive videos comprising a plurality of interactive segments respectively stored in the storing unit independently, each of the interactive segments respectively corresponding to a plurality of interactive options, a plurality of video element and a plurality of display weighting; and a communicating unit, electrically connects with the processor; wherein, the processor executes the program code to receive a control signal from a viewing end device, the control signal indicating a first interactive video of the interactive videos is selected, then the processor retrieving the interactive segments of the first interactive video from the storing unit, as well as the corresponding interactive options, the corresponding video elements and the corresponding display weightings, and transmitting to the viewing end device through the communicating unit; wherein, when the viewing end device plays the interactive segment of the first interactive video, the interactive options corresponding to the interactive segment is displayed on the interactive segment, and the video elements corresponding to the interactive segment being respectively displayed on the corresponding interactive options for a time percentage of each said display weighting corresponding to each of the video elements.

In another embodiment of the interactive video transmitting device, each of the interactive videos respectively corresponds to a linear reference table stored in the storing unit; each of the linear reference tables comprises the interactive options, the video elements and the display weightings respectively corresponding to each of the interactive segments.

In another embodiment of the interactive video transmitting device, the processor transmits the interactive segments of the first interactive video according to a linear segment playing sequence, and transmits the first interactive video and the interactive videos subsequent to the first interactive video according to a linear video playing sequence.

In another embodiment of the interactive video transmitting device, the processor receives a first control signal from the viewing end device through the communicating unit, the first control signal indicating that a first interactive option displaying a first video element is selected; wherein the first interactive option of said interactive options, said interactive options being displayed on a first interactive segment playing on the viewing end device or displayed on an interactive menu by the viewing end device, and the first video element corresponding to a certain visible object shown in the first interactive segment, the first interactive segment being one of the interactive segments of the first interactive video, and the first video element corresponding to a first video element identifier, the first interactive segment comprising a first interactive segment identifier, said interactive segments in the storing unit comprising at least a second interactive segment with a second interactive segment identifier, the first interactive segment identifier and the second interactive segment identifier being respectively associated with the first video element identifier, and according to the first video element identifier, the first interactive segment identifier and the second interactive segment identifier, the processor further retrieving and transmitting the first interactive segment and the second interactive segment for playing on the viewing end device.

In another embodiment of the interactive video transmitting device, the processor further retrieves and transmits an increased first display weighting and an increased second display weighting associated with the first video element through the communicating unit. When the first interactive segment and the second interactive segment are played respectively on the viewing end device, the first video element is displayed respectively on the corresponding ones of said interactive options according to the first display weighting and the second display weighting.

In another embodiment of the interactive video transmitting device, the processor further retrieves and transmits a third display weighting corresponding to the first interactive segment and a third video element through the communicating unit. The third video element and the first video element jointly correspond to a same one of the interactive options of the first interactive segment. And the third display weighting is lower than the first display weighting.

In another embodiment, a viewing end device is provided. the viewing end device comprises: a processing unit; a memory unit, electrically connecting with the processing unit and storing a program code; a network unit, electrically connects the processing unit; and an AV output unit, electrically connecting with the processing unit; wherein, the processing unit executes the program code for: receiving a control signal and transmitting through the network unit to a transmitting device stored with a plurality of interactive videos, the control signal indicating that a first interactive video of said interactive videos is selected, and through the network unit, receiving a plurality of interactive segments of the first interactive video, as well as a plurality of interactive options, a plurality of video elements and a plurality of display weightings corresponding to the first interactive video; and when displaying one of the interactive segment of the first interactive video through the AV output unit, display the interactive options corresponding to the interactive segment on the interactive segment, and the video elements corresponding to the interactive segment being respectively displayed on the corresponding interactive options for a time percentage of each said display weighting corresponding to each of the video elements.

In another embodiment of the viewing end device, the processing unit receives a first control signal indicating that a first interactive option displaying a first video element is selected, wherein the first interactive option is one of said interactive options, said interactive options being displayed on a first interactive segment playing on the AV output unit or displayed on an interactive menu by the AV output unit, and the first video element corresponding to a certain visible object shown in the first interactive segment, the first interactive segment being one of the interactive segments of the first interactive video, and the first video element corresponding to a first video element identifier, the first interactive segment comprising a first interactive segment identifier, said interactive segments comprising at least a second interactive segment with a second interactive segment identifier, the first interactive segment identifier and the second interactive segment identifier being respectively associated with the first video element identifier, and the processing unit receiving the first interactive segment and the second interactive segment and playing on the AV output unit.

In another embodiment of the viewing end device, the processing unit further receives an increased first display weighting and an increased second display weighting associated with the first video element through the network unit. When the first interactive segment and the second interactive segment are played respectively on the AV output unit, the first video element being displayed respectively on the corresponding ones of said interactive options according to the first display weighting and the second display weighting.

In another embodiment of the viewing end device, the processing unit further receives a third display weighting corresponding to the first interactive segment and a third video element through the network unit. The third video element and the first video element jointly corresponding to a same one of the interactive options of the first interactive segment. And the third display weighting being lower than the first display weighting.

In another embodiment, an interactive video transmitting method is provided. The interactive video transmitting method comprises: receiving a control signal from a viewing end device, the control signal indicating that a first interactive option displaying a first video element is selected, wherein the first interactive option is one of a plurality of interactive options, said interactive options being displayed on a first interactive segment in play or displayed on an interactive menu, and the first video element corresponding to a certain visible object shown in the first interactive segment, the first interactive segment being one of a plurality of interactive segments of a plurality of interactive videos, wherein the first video element corresponds to a first video element identifier, the first interactive segment comprising a first interactive segment identifier, said interactive segments comprising a second interactive segment with a second interactive segment identifier, the first interactive segment identifier and the second interactive segment identifier being respectively associated with the first video element identifier; and according to the first video element identifier, the first interactive segment identifier and the second interactive segment identifier, the processor further retrieving and transmitting the first interactive segment and the second interactive segment for playing on the viewing end device.

In another embodiment of the interactive video transmitting method, each of the interactive videos respectively corresponds to a linear reference table. Each of the linear reference tables comprises the interactive options, a plurality of video elements and a plurality of display weightings respectively corresponding to each of the interactive segments.

In another embodiment, the interactive video transmitting method further comprises retrieving and transmitting an increased first display weighting and an increased second display weighting associated with the first video element, when the first interactive segment and the second interactive segment are played respectively on the viewing end device. The first video element is displayed respectively on the corresponding ones of said interactive options according to the first display weighting and the second display weighting.

In another embodiment, the interactive video transmitting method further comprises retrieving and transmitting a third display weighting corresponding to the first interactive segment and a third video element. The third video element and the first video element jointly correspond to a same one of the interactive options of the first interactive segment. And the third display weighting is lower than the first display weighting.

In another embodiment, an interactive video playing method is provided. The interactive video playing method comprises: receiving and transmitting a control signal to a transmitting device, the control signal indicating that a first interactive option displaying a first video element is selected, wherein the first interactive option is one of a plurality of interactive options, said interactive options being displayed on a first interactive segment in play or displayed on an interactive menu, and the first video element corresponding to a certain visible object shown in the first interactive segment, the first interactive segment being one of a plurality of interactive segments of a plurality of interactive videos, wherein the first video element corresponds to a first video element identifier, the first interactive segment comprising a first interactive segment identifier, said interactive segments comprising at least a second interactive segment with a second interactive segment identifier, the first interactive segment identifier and the second interactive segment identifier being respectively associated with the first video element identifier; and receiving and playing the first interactive segment and the second interactive segment on a viewing end device.

In another embodiment, the interactive video playing method further comprises receiving an increased first display weighting and an increased second display weighting associated with the first video element. When the first interactive segment and the second interactive segment are displayed respectively on the viewing end device, the first video element is displayed respectively on the corresponding ones of said interactive options according to the first display weighting and the second display weighting.

In another embodiment, the interactive video playing method further comprises receiving a third display weighting corresponding to the first interactive segment and a third video element through the network unit. The third video element and the first video element jointly correspond to a same one of the interactive options of the first interactive segment. And the third display weighting is lower than the first display weighting.

In brief, according to the systems, devices and methods for transmitting and playing interactive videos introduced in the embodiments of the instant disclosure, now the interactive videos can be provided to the users for interactive operations on the interactive videos by simply operating the interactive options displayed thereon, which is applicable to various applications of video transmitting and playing technologies. In addition, by integrating the technical features disclosed in the embodiments of the instant disclosure, as each of the interactive videos are divided into interactive segments respectively stored as independent digital files and respectively assigned with dedicated interactive segment identifiers, each video elements illustrated in the interactive segments are able to associate with corresponding illustrated interactive segment(s) through video element identifiers. Furthermore, through the display weightings respectively assigned to each of the video element displayed on the interactive options, the display duration for each video element displayed on the interactive options may be further determined, thereby facilitating the control of the content being displayed accordingly after one of the interactive options is selected. Meanwhile, non-linear playback mode based on a selected video element can be realized by the embodiments of the instant disclosure, which not only extends outside the rigid linear playback mode, but also increase the presence duration of the merchandise(s) or interactive operation(s) associated with the selected video element, thereby expanding the variety of the interactively operations during the playback process of the interactive videos.

BRIEF DESCRIPTION OF THE DRAWINGS

The disclosure will become more fully understood from the detailed description given herein below for illustration only, and thus not limitative of the disclosure, wherein:

FIG. 12C illustrates an explanatory view of a nonlinear reference tables utilized while nonlinearly transmitting and playing interactive videos according to the sixth embodiment of the instant disclosure.

DETAILED DESCRIPTION

Figure 1:
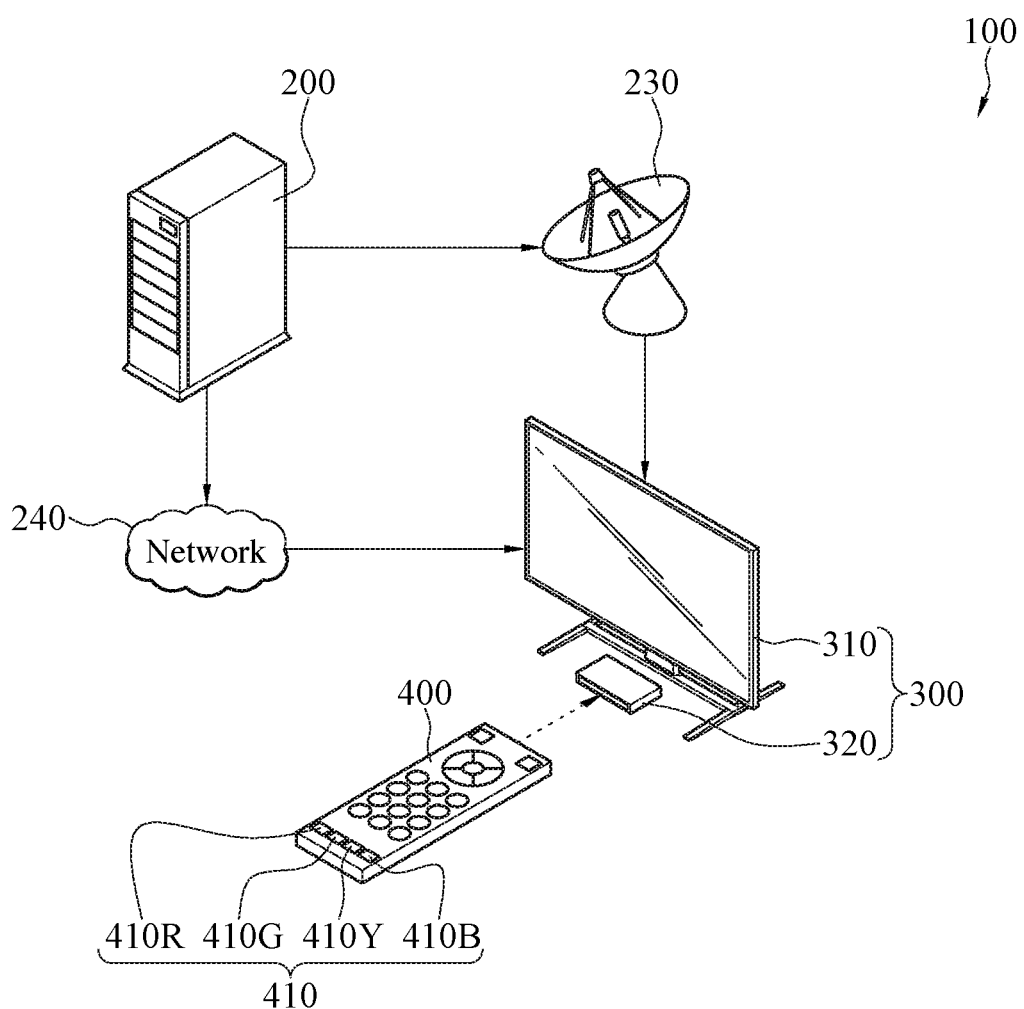
FIG. 1 illustrates an architectural explanatory diagram of an interactive video transmitting system according to a first embodiment of the instant disclosure.
Figure 2:
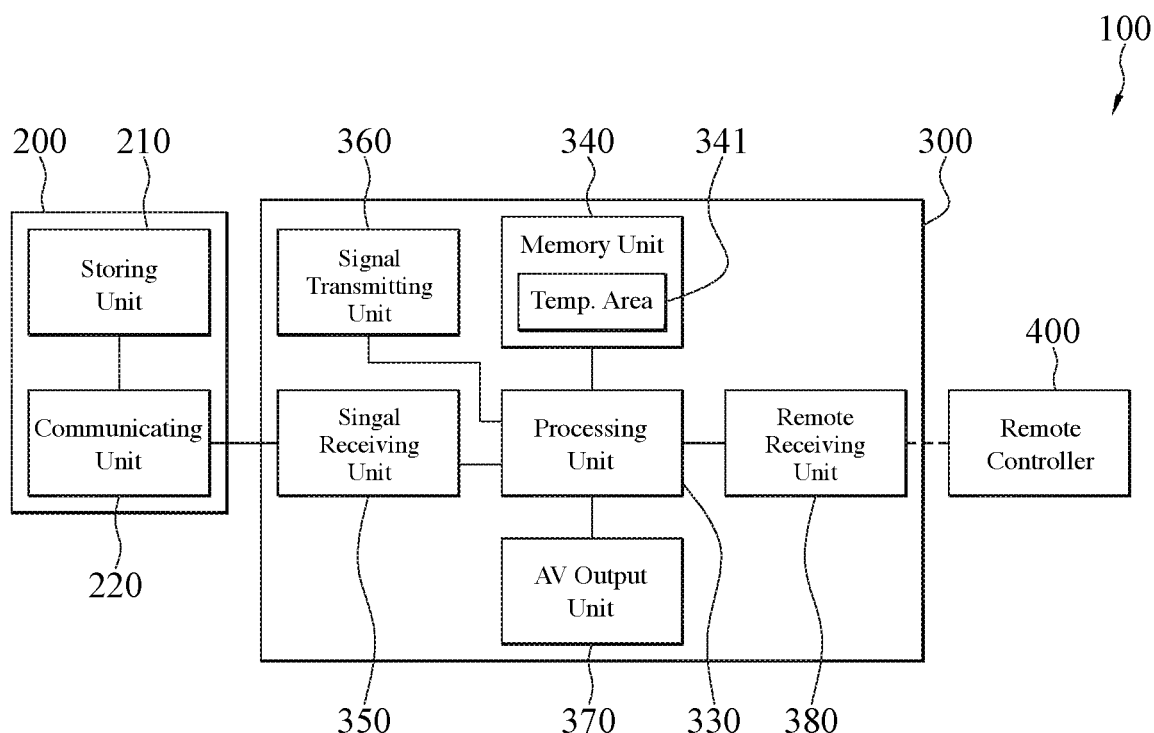
FIG. 2 illustrates a block diagram of the interactive video transmitting system according to the first embodiment of the instant disclosure.

Please refer to FIG. 1, which illustrates an architectural explanatory diagram of an interactive video transmitting system 100 according to a first embodiment of the instant disclosure. interactive video transmitting system 100 comprises an interactive video transmitting device 200, a viewing end device 300 and a remote controller 400. Refer to FIG. 2, which illustrates a block diagram of the interactive video transmitting system 100 according to the first embodiment of the instant disclosure. The interactive video transmitting device 200, realizable by one or more servers, comprises a storing unit 210 and a communicating unit 220.

The storing unit 210 is a non-volatile storage such as flash memory, hard drive or other optical storage media, magnetic storage media, solid-state storage media, etc. The storing unit 210 stores one or more interactive videos, and interactive menu information corresponding to each of the interactive videos; detailed description will be provided in the following sections. The communicating unit 220 may be a communication apparatus supporting DVB (Digital Video Broadcasting), DVB-S (Digital Video Broadcasting-Satellite), DVB-C (Digital Video Broadcasting-Cable), DVB-T (Digital Video Broadcasting-Terrestrial) or Digital Video Broadcasting-Handheld (DVB-H). For instance, as shown in FIG. 1, if the communicating unit 220 utilizes digital video broadcasting through satellites, the communicating unit 220 will transmit the television signals to a terrestrial station 230 so that the television signals are transmitted to the satellite(s) (not shown) through the terrestrial station 230 and then the viewing end device 300 may receive the television signals through a satellite antenna (not shown). Here the television signals include the interactive video(s) 500 and the corresponding interactive menu information. If the communicating unit 220 is a communication apparatus supporting communication protocols of IPTV (Internet Protocol Television), the communicating unit 220 will be connected to a network 240 so that the television signals can be transmitted. The network 240 mentioned herein may be realized by LAN (Local Area Network) or WAN (Wide Area Network).

Refer to FIG. 1 and FIG. 2; depending on the transmission technology for the television signals, the viewing end device 300 may be a television 310 or a set-top box 320 connecting to the television 310. The viewing end device 300 comprises a processing unit 330, a memory unit 340, a signal receiving unit 350, a signal transmitting unit 360, an AV (audio-video) output unit 370 and a remote receiving unit 380. The processing unit 330 electrically connects the memory unit 340, the signal receiving unit 350, the signal transmitting unit 360, the AV output unit 370 and the remote receiving unit 380.

The processing unit 330 may be realized by one or more processing components to control other components being connected thereto. The processing component may be, for example, a microprocessor, microcontroller, digital signal processor, microcomputer, central processing unit, Field Programmable Gate Array (FPGA), Programmable Logic Device (PLD), state machine, logic circuit, analog circuit, digital circuit and/or any device that operates signals (analog or digital) based on operating commands.

The memory unit 340 comprises volatile memory and non-volatile memory (not shown). The non-volatile memory stores the program code executed by the processing unit 330, user information, said interactive videos 500 and information such as interactive menu information. The volatile memory stores the temporary information while the processing unit 330 executes programs. In some embodiments, the information stored in the non-volatile memory may be stored in the volatile memory as well, such as the interactive menu information.

The signal receiving unit 350 supports the communication technology that the interactive video transmitting device 200 utilizes to transmit videos. It also comprises a signal processing circuit or signal processing software to conduct signal processing to the communication signals for obtaining the interactive videos 500 and the interactive menu information. The AV output unit 370 may be a screen and a speaker to output the interactive videos 500 in both image and sound formats. Or the AV output unit 370 may be an audio-video transmission interface (such as HDMI, AV connector, component video connector, etc.) to output in both image and sound formats. The remote receiving unit 380 is to receive the wireless signals transmitted from the remote controller 400, which supports wireless communication formats such as infrared ray, radio frequency, blue tooth, etc.

Refer to FIG. 1, the remote controller 400 controls the television 310 and/or the set-top box 320, and comprises multiple color function keys 410. Generally there are four color function keys 410, each of which is red function key 410R, green function key 410G, yellow function key 410Y and blue function key 410B. The remote controller 400 also comprises other buttons such as a power button, number buttons, channel switch buttons, volume buttons, etc., which already have their predetermined certain functions respectively. Generally the color function keys 410 are not defined with certain functions, therefore the embodiment use the color function keys 410 to facilitate the interactions of the video contents for the users. The remote controller 400 also comprises circuit board (not shown) to detect the triggering (operations such pressing or touch) of said buttons, and wirelessly transmit control signals corresponding to the triggered button. The control signal comprises a code corresponding to the triggered button, and differentiated by the different codes of the buttons, the television 310 or set-top box 320 may acknowledge which button is triggered by the received code.

Figure 3:
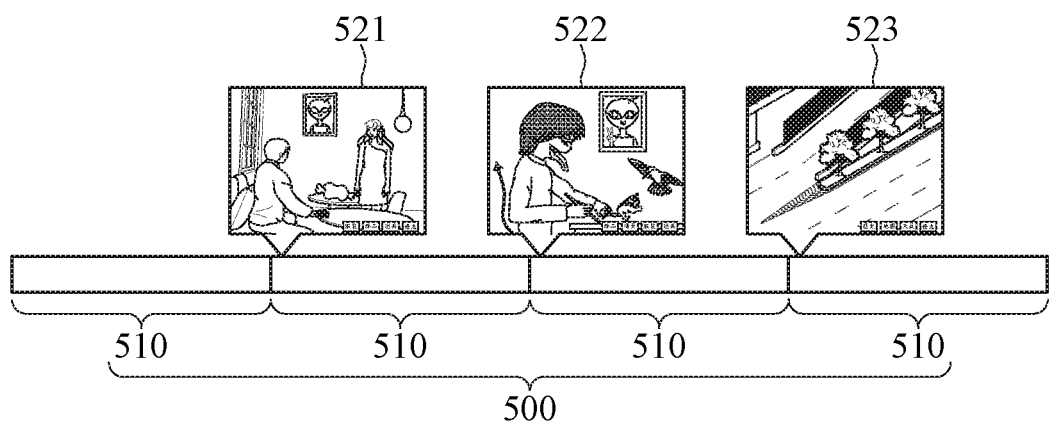
FIG. 3 illustrates an explanatory diagram of an interactive video according to the first embodiment of the instant disclosure.
Figure 4:
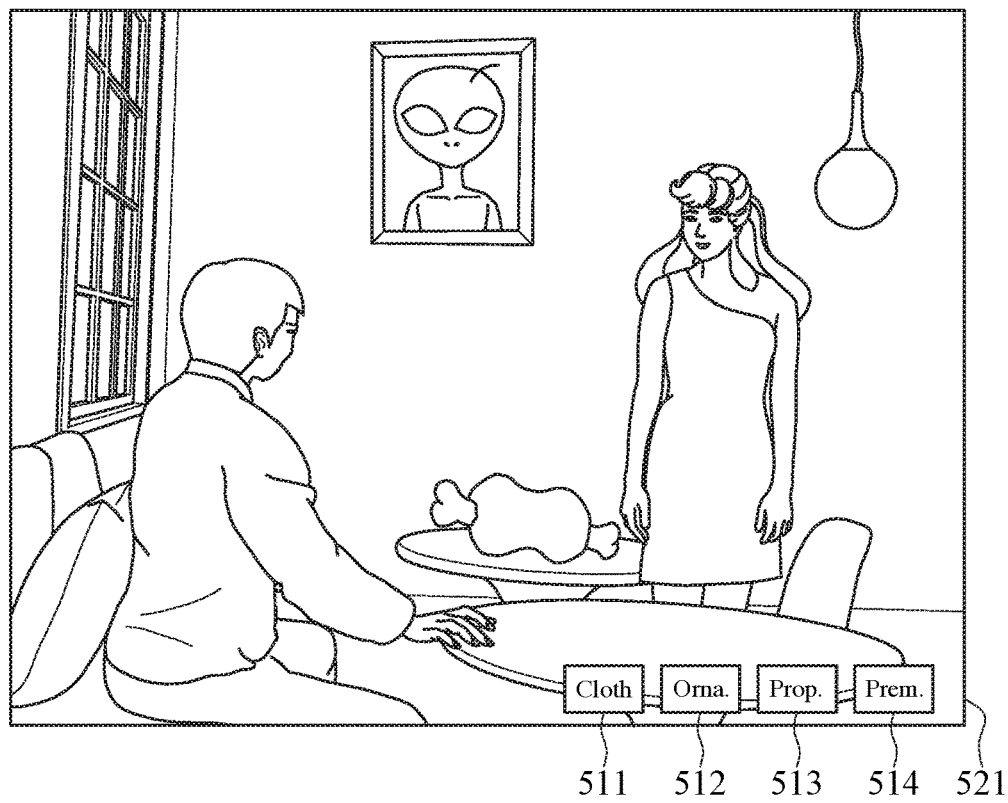
FIG. 4 illustrates an explanatory diagram of a frame of an interactive segment according to the first embodiment of the instant disclosure.

Refer to FIG. 3, which illustrates an explanatory diagram of an interactive video according to the first embodiment of the instant disclosure. The interactive video 500 includes at least one interactive segment 510. Multiple interactive segments 510 are shown here as an example. In some embodiments, the interactive video 500 includes non-interactive segment (not shown), namely partial segments of the interactive video 500 may be non-interactive segments. Each of the interactive segments 510 may be a different scene. Refer to FIG. 4, which illustrates an explanatory diagram of a frame of an interactive segment according to the first embodiment of the instant disclosure. In the playing process of the interactive video 500, a frame 521 of the interactive segment 510 comprises multiple interactive options 511, 512, 513, 514. The interactive options 511, 512, 513, 514 here respectively corresponding to the color function keys 410 of the remote controller 400. The ways of corresponding may be, for instance, the interactive options 511, 512, 513, 514 illustrate the corresponding colors as the color function keys 410. Namely, the interactive option 511 illustrates red color corresponding to the red function key 410R; the interactive option 512 illustrates green color corresponding to the green color function key 410G; the interactive option 513 illustrates yellow color corresponding to the yellow function key 410Y; and the interactive option 514 illustrates blue color corresponding to the blue function key 410B. Here the interactive option 514 is disposed at the right bottom color of the frame 521 but that is not a general limitation to all the embodiments of the instant disclosure. Each interactive option may be disposed at any appropriate position in the frame.

Figure 5:
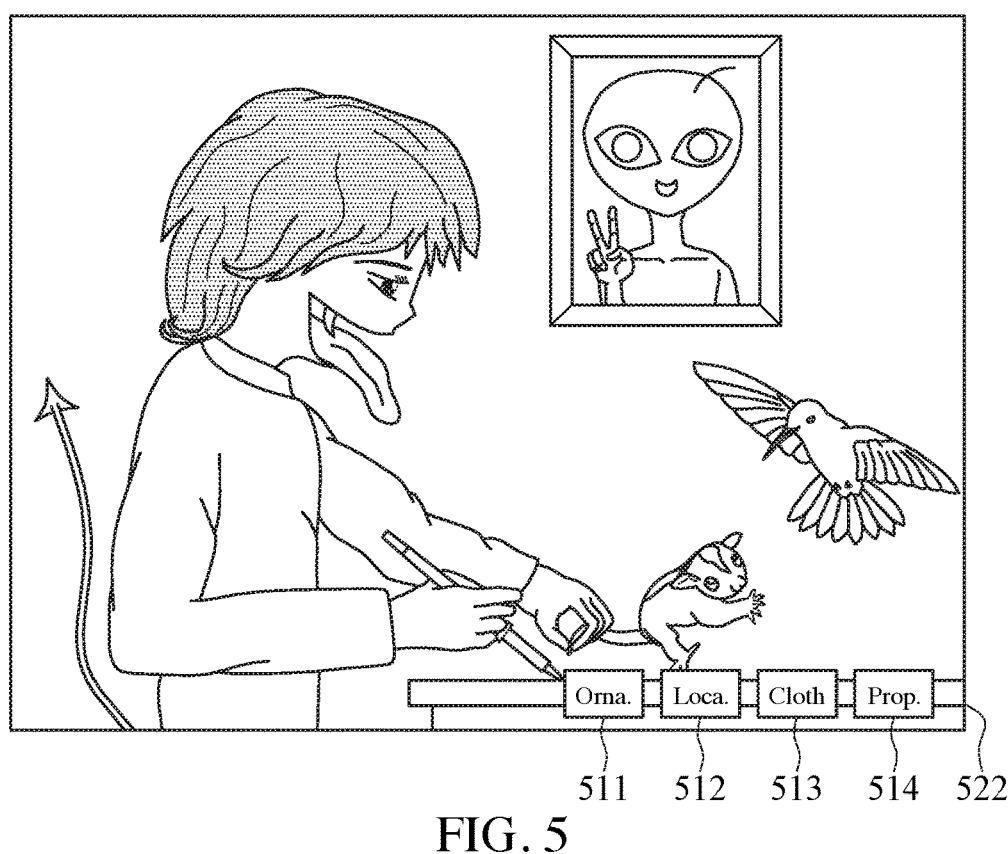
FIG. 5 illustrates an explanatory diagram of another frame of another interactive segment according to the first embodiment of the instant disclosure.

In some embodiments, the interactive options 511, 512, 513, 514 may corresponding to different commands. Such commands may be part of the aforesaid interactive menu information. In addition, even corresponding to the same color function keys 410, the interactive options 511, 512, 513, 514 displayed on each interactive segment 510, may correspond to different contents. For example, on the frame 521 shown in FIG. 4, the content of the interactive option 511 shows "Cloth"; the content of the interactive option 512 shows "Ornament"; the content of the interactive option 513 shows "Property"; and the content of the interactive option 514 shows "Premium". On the frame 522 shown in FIG. 5, the content of the interactive option 511 shows "Ornament"; the content of the interactive option 512 shows "Location"; the content of the interactive option 513 shows "Cloth"; and the content of the interactive option 514 shows "Property". On the frame 523 shown in FIG. 6, the content of the interactive option 511 shows "History"; the content of the interactive option 512 shows "Map"; the content of the interactive option 513 shows "Weather"; and the content of the interactive option 514 shows "Premium".

Figure 6:
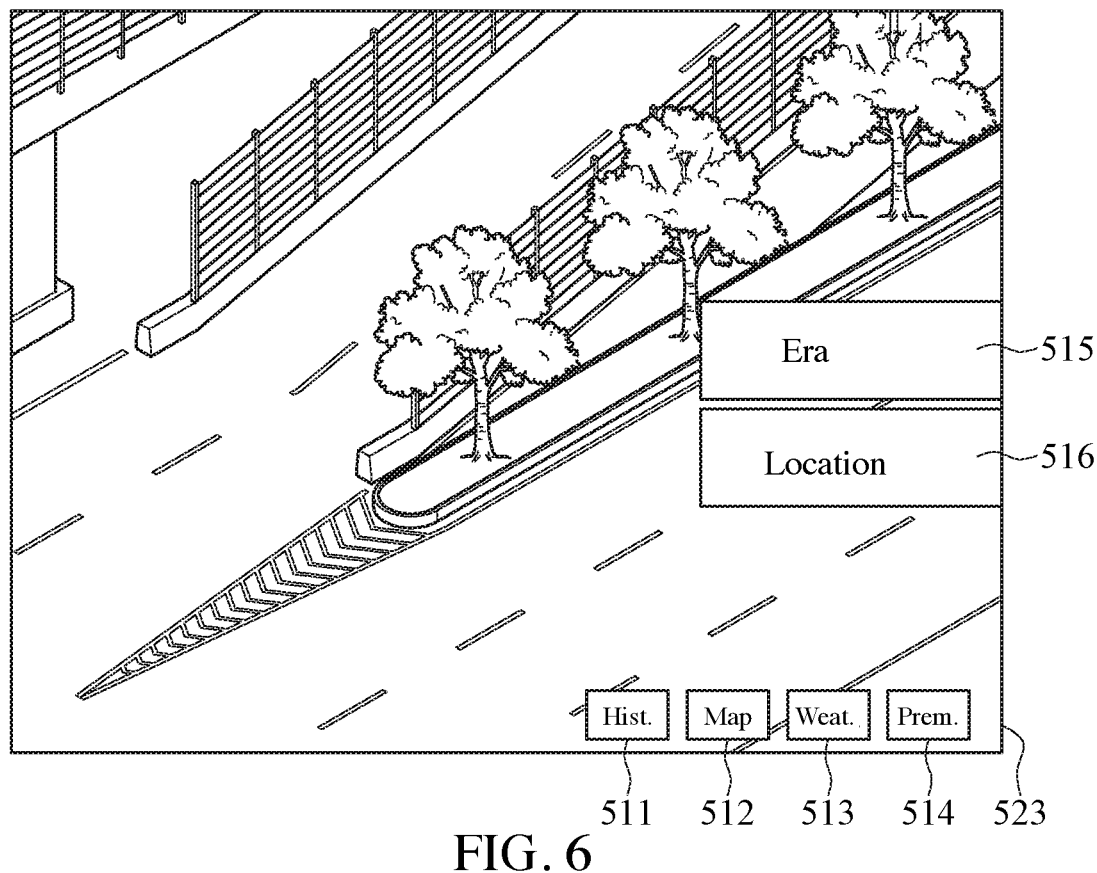
FIG. 6 illustrates an explanatory diagram of another frame of another interactive segment according to the first embodiment of the instant disclosure.
Figure 7:
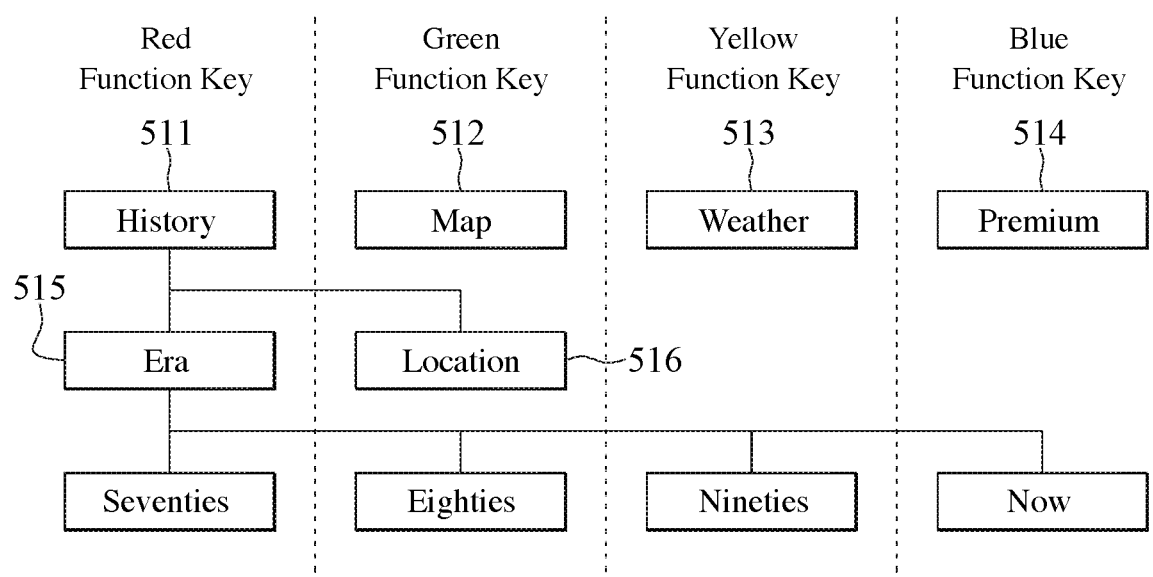
FIG. 7 illustrates an explanatory diagram of reference relations between color function keys and the interactive options in FIG. 6.

FIG. 6 is now introduced as an example to disclose the relations between the interactive options 511, 512, 513, 514 and the corresponding commands Refer to FIG. 2, FIG. 6 and FIG. 7 jointly. FIG. 7 illustrates an explanatory diagram of reference relations between color function keys 410 and the interactive options 511, 512, 513, 514 in FIG. 6. The interactive menu information comprises the contents and the commands of the interactive options 511, 512, 513, 514 corresponding to each time point of the timeline of the interactive video 500. While playing the interactive video 500, the processing unit 330 inquires the interactive menu information and simultaneously displays the contents on the corresponding interactive options 511, 512, 513, 514 on the frame 523. As shown in FIG. 7, the red function keys 410R corresponds to the interactive option 511 that shows "History". After the user operates the remote controller 400 and triggers the red function key 410R, the remote receiving unit 380 of the viewing end device 300 will receive the control signal corresponding to the red function key 410R. Afterwards, the processing unit 330 inquires in memory unit 340 for the interactive menu information and, based on the played interactive segment 510 upon the reception of the control signal, inquires for the command corresponding to the triggered interactive option 511. And then execute the command. The command here is to display the next layer menu of the "History" option. Therefore, the frame 523 additionally the interactive option 515, 516. The interactive option 515 shows "Era"; the interactive option 516 shows "Location". The additionally-shown interactive option 515, 516 may be displayed by using an OSD (On Screen Display) system of the viewing end device 300. The interactive options 515, 516 may similarly have the colors corresponding to the color function keys 410. The interactive option 515 here has the color corresponding to the red function key 410R; and the interactive option 516 has the color corresponding to the green function key 410G. If the user is interested in the era of the location, operating the remote controller 400 to trigger the red function key 410R again will allow the viewing end device 300 to display the next layer of the "Era" option, as mentioned previously about the transmission of the control signal. The next layer of the "Era" comprises "70s" (seventies), "80s" (eighties), "90s" (nineties) and "Now", as shown in FIG. 7. Through the descriptions above, the interactive option 511~516 corresponding to at least one interactive segment 510 may form a hierarchical menu. Thus, the user may simply operate the four color function keys 410 to conduct interactive operations on the interactive video 500. For instance, based on the examples above, when the user subsequently triggers the green function key 410G, the viewing end device 300 will display the history information of the location in the eighties on the frame 523. Such history information may be stored within the interactive menu information, or be retrievable from a webpage link stored within the interactive menu information. In other words, the aforesaid commands corresponding to the interactive options 511~516 are to enter the next layer menu and display the information stored within the interactive menu information, or display the information retrieved from a link stored within the interactive menu information.

In an embodiment, as shown in FIG. 4, the user may, through the aforesaid operations, browse the objects displaying on the frame 521 of the interactive segment 510, such as browsing the detailed information regarding to the clothes, ornaments and properties. Namely, the commands corresponding to the interactive options 511, 512, 513, 514 are associated with the objects displaying on the frame 521. The viewing end device 300 stores the merchandise information corresponding to the browsed objects in the temporary area 341 of the memory unit 340. The merchandise information may be merchandise numbers. The interactive menu information further comprises the information corresponding to the merchandise numbers, such as merchandise items, content descriptions, usage descriptions, manufacturer information, etc. Therefore, the processing unit 330 can inquire the merchandise number among the interactive menu information to obtain the information of the corresponding merchandise. The temporary area 341 may be stored in the aforesaid volatile storage or non-volatile storage. After the interactive video 500 finishes playing, the viewing end device 300 may transmit purchase confirmation message through the signal transmitting unit 360 to a user device. The purchase confirmation message comprises the merchandise information stored in the temporary area 341, such that the user may confirm to purchase or select to browse again and review any other merchandise. The purchase confirmation message may be transmitted in the formats of email or text message. The signal transmitting unit 360 here may support communication technologies such as wired network or wireless network, or 2G, 3G, 4G mobile communications. The user device here may be the user's own mobile phone, computer or electrical apparatus, or any other mobile phone, computer or electrical apparatus that log in with the user's identity.

In an embodiment, the signal transmitting unit 360 may periodically transmit the purchase confirmation message to the user device. In another embodiment, the user determines, through the remote controller 400, whether the merchandise information stored in the temporary area 341 should be transmitted outwards. Namely, when the user triggers some button on the remote controller 400, in response to the received signal of the pressed button on the remote receiving unit 380, the processing unit 330 controls the signal transmitting unit 360 to transmit the purchase confirmation message to the user device. Thus, the user may operate to confirm the merchandise item the user about to purchase on the user device, and then complete the purchase process.

In an embodiment, the purchase confirmation message comprises a web address link, which directs to a shopping list webpage on a shopping website. The shopping list webpage by default may comprises the merchandise information stored in the temporary area 341, allowing the user to confirm which one(s) among the merchandises on the shopping list webpage to be purchased. The signal transmitting unit 360 here also transmit the merchandise information stored in the temporary area 341 to the shopping website to generate the shopping list webpage by the shopping website.

In an embodiment, if the communicating unit 220 of the interactive video transmitting device 200 is a communication apparatus supporting IPTV communication protocols, the processing unit 330 may display the merchandise information stored in the temporary area 341 on the OSD system for the user to confirm the merchandises to purchase. And then the selected desired merchandise item about to be purchased is transmitted back to the interactive video transmitting device 200 by the signal transmitting unit 360, and afterwards the interactive video transmitting device 200 transmits the desired merchandise item to the shopping website to complete the merchandise ordering operation. Or, through the signal transmitting unit 360 may the desired merchandise item be transmitted to the shopping website to complete the merchandise ordering operation.

Figure 8:
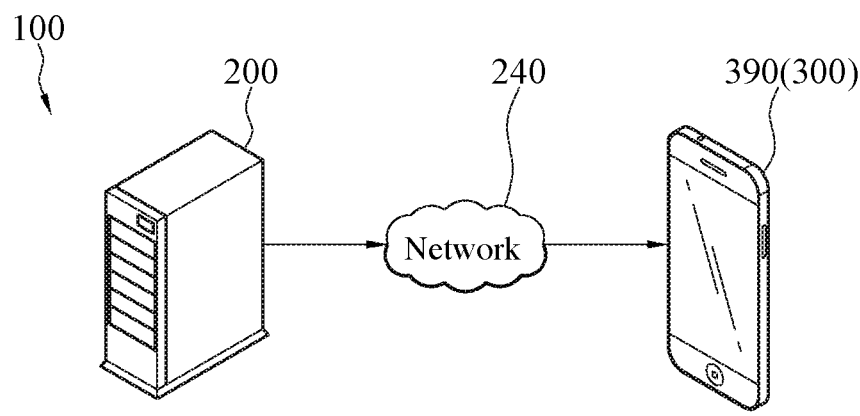
FIG. 8 illustrates an architectural explanatory diagram of an interactive video transmitting system according to a first embodiment of the instant disclosure.
Figure 9:
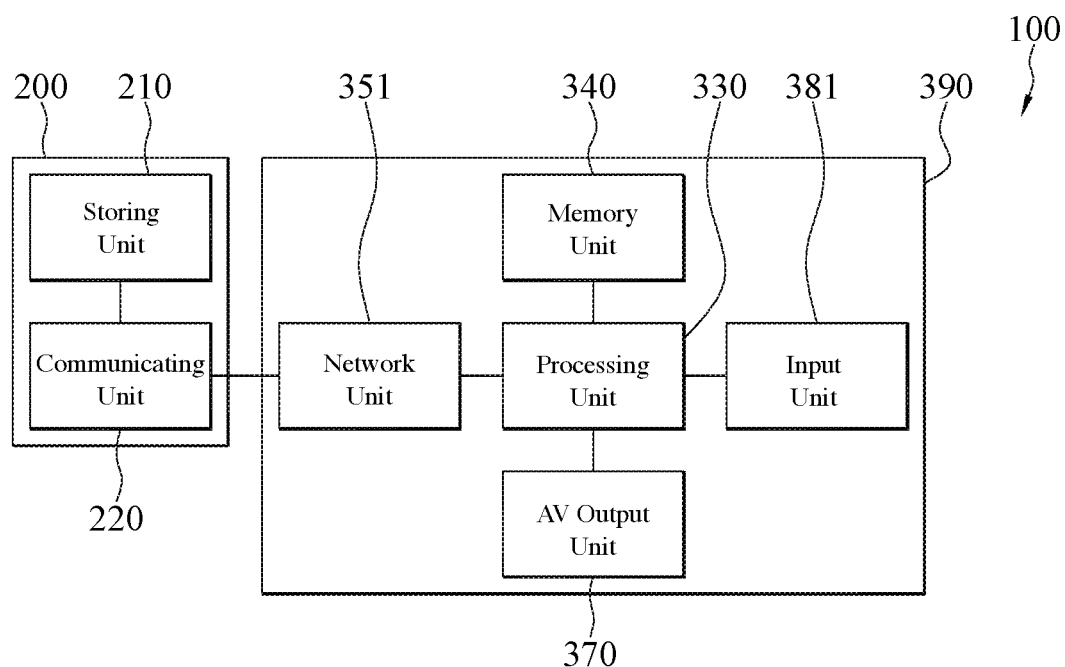
FIG. 9 illustrates a block diagram of the interactive video transmitting system according to the second embodiment of the instant disclosure.

FIG. 8 illustrates an architectural explanatory diagram of an interactive video transmitting system according to a first embodiment of the instant disclosure. FIG. 9 illustrates a block diagram of the interactive video transmitting system according to the second embodiment of the instant disclosure. Jointly refer to FIG. 8 and FIG. 9, the differences from the first embodiment is that, the viewing end device 300 in this embodiment is a connected device 390 (such as a mobile phone, computer, etc.; a mobile phone is taken as an example here), which comprises a processing unit 330, a memory unit 340, an AV output unit 370, a network unit 351 and an input unit 381. The processing unit 330, memory unit 340 and AV output unit 370 are similar to the first embodiment and no description would be repeated herein. The network unit 351 is a communication module supporting wired network or wireless network. The input unit 381 may be an input interface such as a touch screen, mouse, keyboard, etc. Such connected device 390 has its memory unit 340 store a computer program product to be executed by the processing unit 330. Through the computer program product, the connected device 390 may connect to the interactive video transmitting device 200, to obtain the interactive video 500 and the corresponding interactive menu information thereof.

In the second embodiment, each of the frames of the interactive segment 510 has multiple interactive options 511, 512, 513, 514 displayed thereon. The differences from the first embodiment is that, the user directly triggers the interactive options 511, 512, 513, 514 via the input unit 381. The commands corresponding to the interactive options 511, 512, 513, 514 are the same as introduced in the first embodiment, and no descriptions would be repeated here. The connected device 390 may display the merchandises ever browsed so the user may confirm what to purchase. Then, the network unit 351 transmits the desired merchandise item back to the interactive video transmitting device 200, so the interactive video transmitting device 200 may transmit the desired merchandise item to the shopping website to complete the merchandise ordering operation. Or, through the network unit 351 may the desired merchandise item be transmitted to the shopping website to complete the merchandise ordering operation.

In brief, based on the previous embodiments, the introduced interactive video transmitting system 100 and the interactive video transmitting device 200 are able to provide the user with the interactive video 500, which allows the user to conduct interactive operations (such as shopping or viewing background information) upon viewing the interactive video 500 by simply operating the interactive options 511, 512, 513, 514, and is applicable to any technology applications in video transmitting and broadcasting.

To develop broader interactive possibilities for the playing operation of the interactive video 500 and the interactive options 511, 512, 513, 514, 515, 516 disclosed according to the previous embodiments and FIG. 1 to FIG. 9 may, not only control a time percentage for display each interactive options 511, 512, 513, 514, 515, 516 when playing any of the interactive segments 510 of the interactive video 500 by setting display weightings, but also receive and play multiple certain interactive segments 510, based on the selecting operation of the interactive options 511, 512, 513, 514, 515, 516, and in response to the selected one of the interactive options 511, 512, 513, 514, 515, 516 to facilitate a nonlinear playing process. Meanwhile, a video element identifier showing on the selected one of the interactive options 511, 512, 513, 514, 515, 516 will involve an automatic adjustment for the display weighting during the nonlinear playing process, to enhance the interactive effects and advantages for both devices in the transmitting end and the viewing end. The interactive options in each embodiment of the instant disclosure, with the video element identifiers shown thereon, and with the video element identifiers corresponding to visible objects displaying in the in-play interactive video and the interactive segments, is configured with commands of links or functions definitions to trigger the subsequent operations or steps.

Figure 10A:
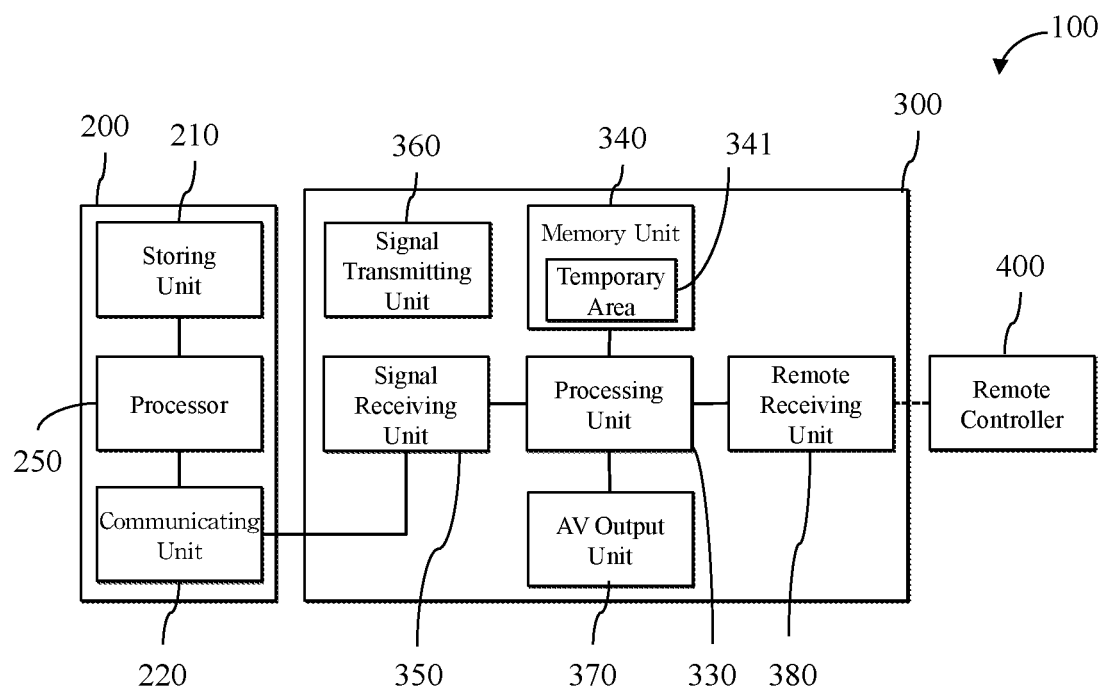
FIG. 10A illustrates a block diagram of the interactive video transmitting system according to a third embodiment of the instant disclosure.
Figure 10B:
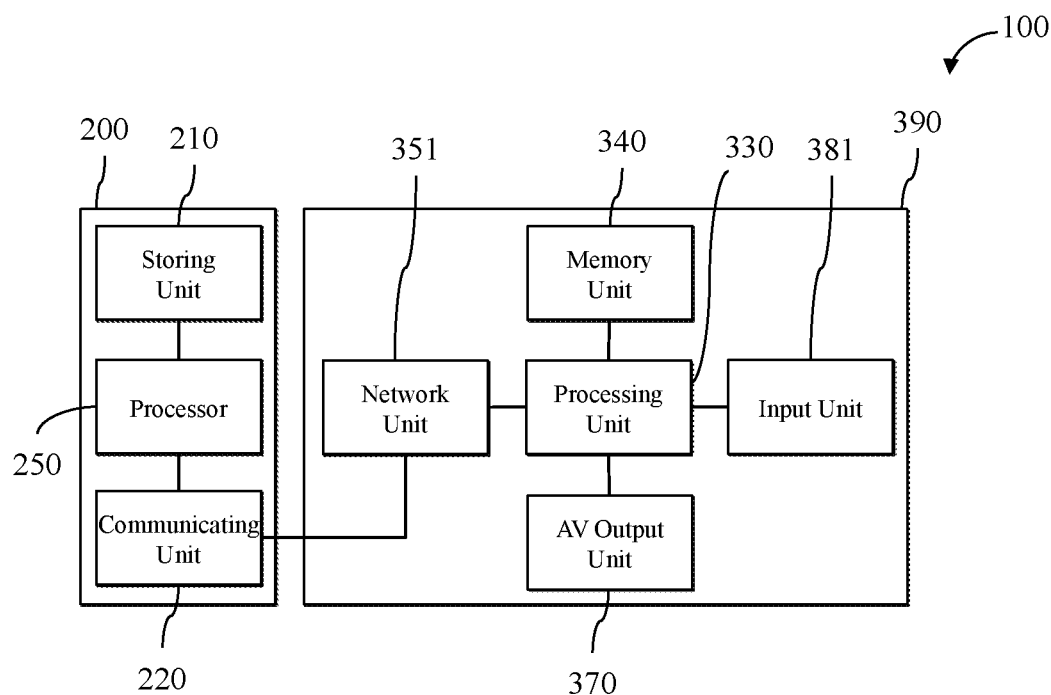
FIG. 10B illustrates a block diagram of the interactive video transmitting system according to a fourth embodiment of the instant disclosure.

Refer to FIG. 10A and FIG. 10B. FIG. 10A illustrates a block diagram of the interactive video transmitting system according to a third embodiment of the instant disclosure. FIG. 10B illustrates a block diagram of the interactive video transmitting system according to a fourth embodiment of the instant disclosure.

In FIG. 10A and FIG. 10B, the interactive video transmitting device 200, realizable by one or more servers, comprises a storing unit 210, a communicating unit 220, a processor 250 and a control circuit (shown as the interconnecting lines between units; no reference number). The control circuit may be realized by circuit board, flexible printed circuit, serial bus, bridge circuit, integrated circuit or any other means, directly or indirectly, operably and electrically connects processor 250, storing unit 210 and communicating unit 220. The processor 250, operably and electrically connected to the storing unit 210 and the communicating unit 220 through the control circuit, may be realized by one or more processing components to control other components being connected thereto. The processing component may be, for example, a microprocessor, microcontroller, digital signal processor, microcomputer, central processing unit, Field Programmable Gate Array (FPGA), Programmable Logic Device (PLD), state machine, logic circuit, analog circuit, digital circuit and/or any device that operates signals (analog or digital) based on operating commands. In different embodiments, the AV output unit 370 in the viewing end device 300, 390 may comprises different image output devices such as a projecting device, a virtual reality apparatus (glasses or headset display), holographic projection device or other planar or three dimensional projection devices, projecting to display the interactive video 500, the interactive segments 510 and the interactive options 511, 512, 513, 514, 515, 516 thereof. Collocating with the aforesaid different types of image output devices of the AV output unit 370, the input unit 381 may comprise: a gesture sensing or motion sensing apparatus based on machine vision technology; a wearable or handheld device, with or without gyro sensors, through touch control, gesture, motion or body sensing operations; through the devices mentioned above may the input unit 381 receive user selection or operation of the interactive options 511, 512, 513, 514, 515, 516 on the in-play interactive video 500 and the interactive segment 510 thereof. In addition, the interactive video transmitting device 200 and the viewing end device 300, 390 comprise different program codes stored in the storing unit 210 and the memory unit 340, the processing unit 330 and processor 250 retrieve and execute the aforesaid different program codes respectively, and then conduct certain partial steps of the interactive video transmitting and playing method on the interactive video transmitting device 200 and viewing end device 300, 390 respectively. The viewing end device 300 receives the interactive video and related interactive video information by the signal receiving unit 350 and transmitting control signals through the signal transmitting unit 360, while the viewing end device 390 completes the aforesaid operations through the network unit 351; the person having ordinary skills in the art should be able to understand that, the term "network unit" herein should have a broad definition by which what external communication components or the combination thereof should be covered. As to other components in the interactive video transmitting system 100, please refer to the aforesaid descriptions and FIG. 1 to FIG. 9, to address further introductions for the descriptions regarding to FIGS. 10A and 10B and the subsequent embodiments and drawings thereof; no repeated descriptions would be provided hereinafter.

Figure 11A:
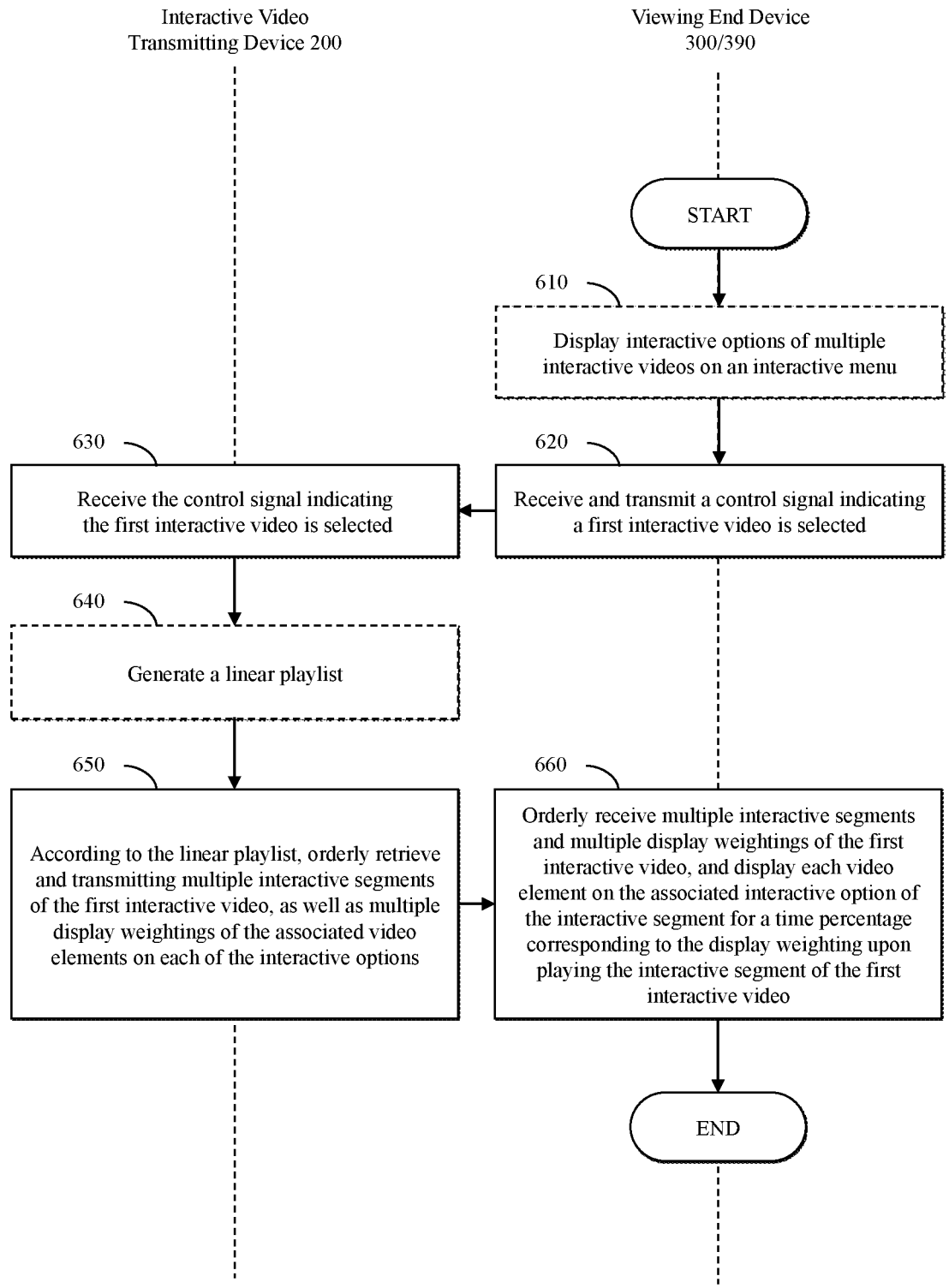
FIG. 11A illustrates a flowchart of a method for transmitting and playing interactive videos according to a fifth embodiment of the instant disclosure.
Figure 11B:
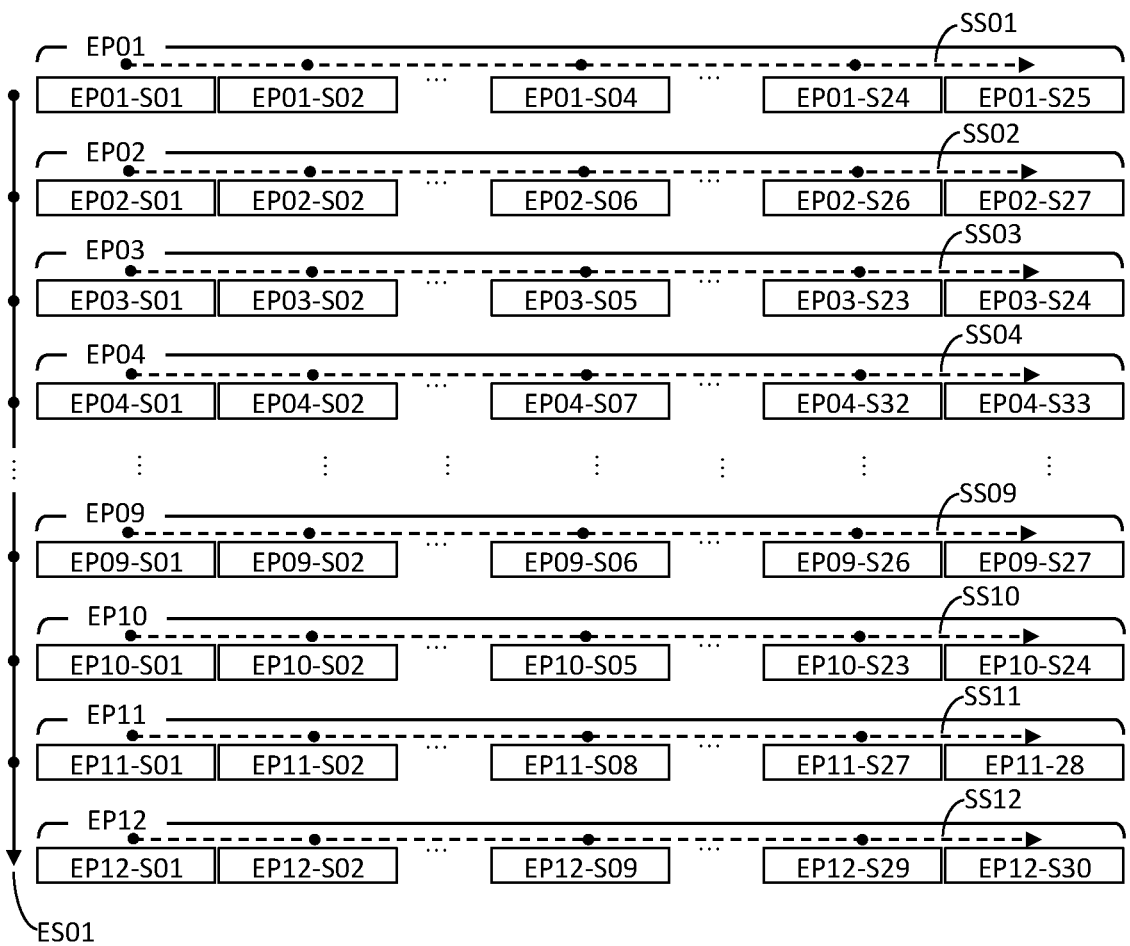
FIG. 11B illustrates an architectural explanatory diagram of the method for linearly transmitting and playing interactive videos according to the fifth embodiment of the instant disclosure.
Figure 11C:
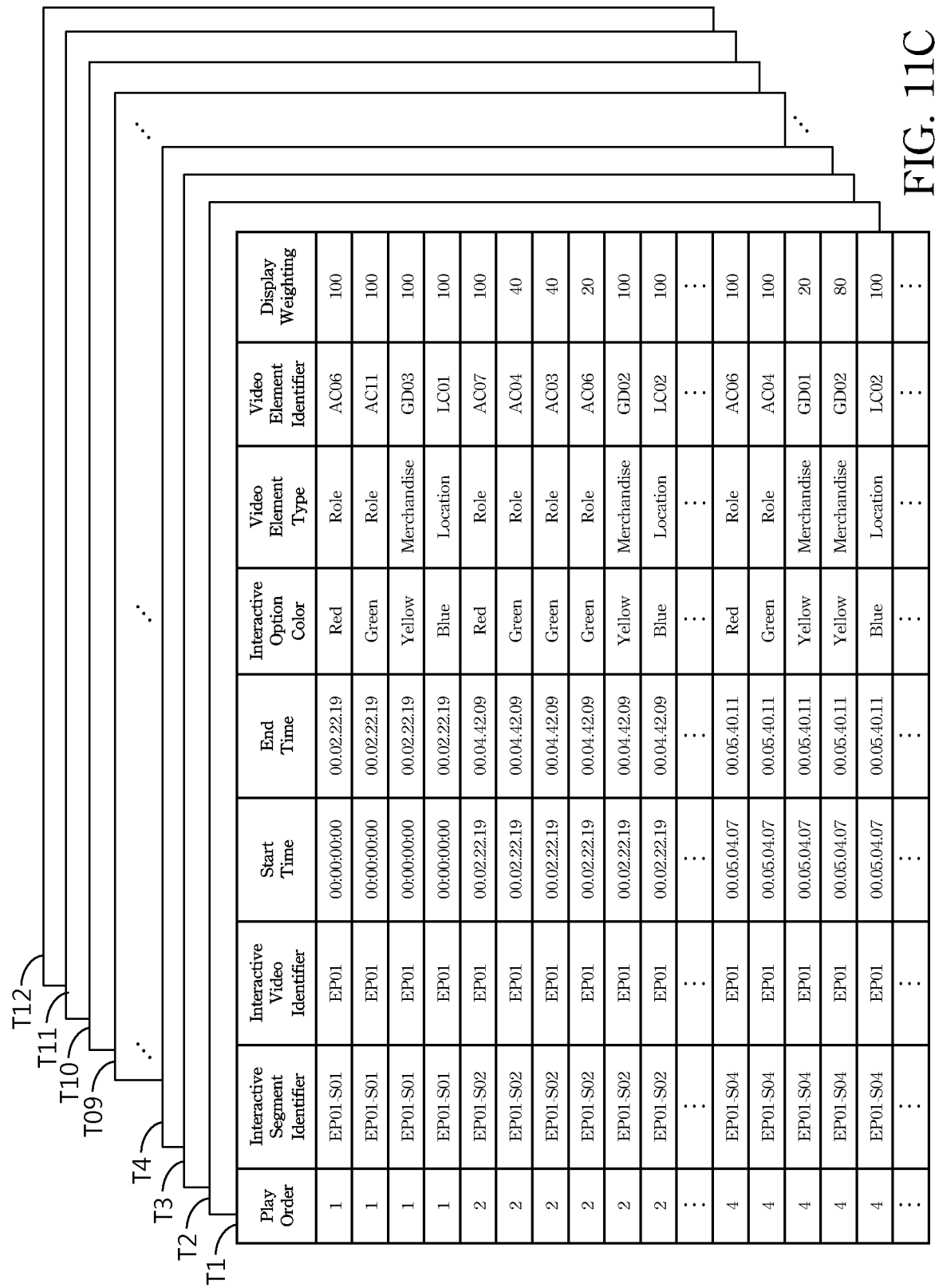
FIG. 11C illustrates an explanatory view of linear reference tables utilized while linearly transmitting and playing interactive videos according to the fifth embodiment of the instant disclosure.
Figure 11D:
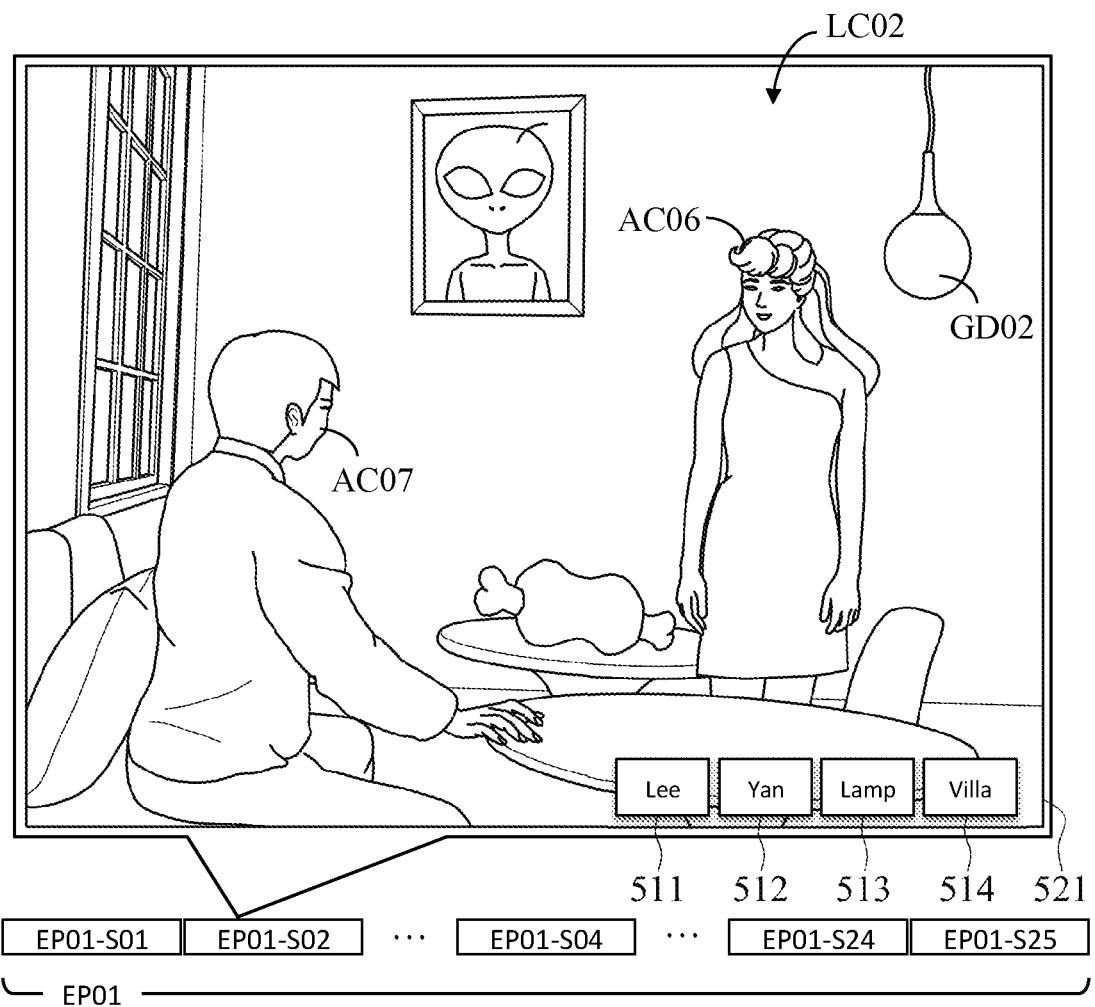
FIG. 11D illustrates an explanatory diagram of a frame of one of interactive segments of an interactive video according to the fifth embodiment of the instant disclosure.
Figure 11E:
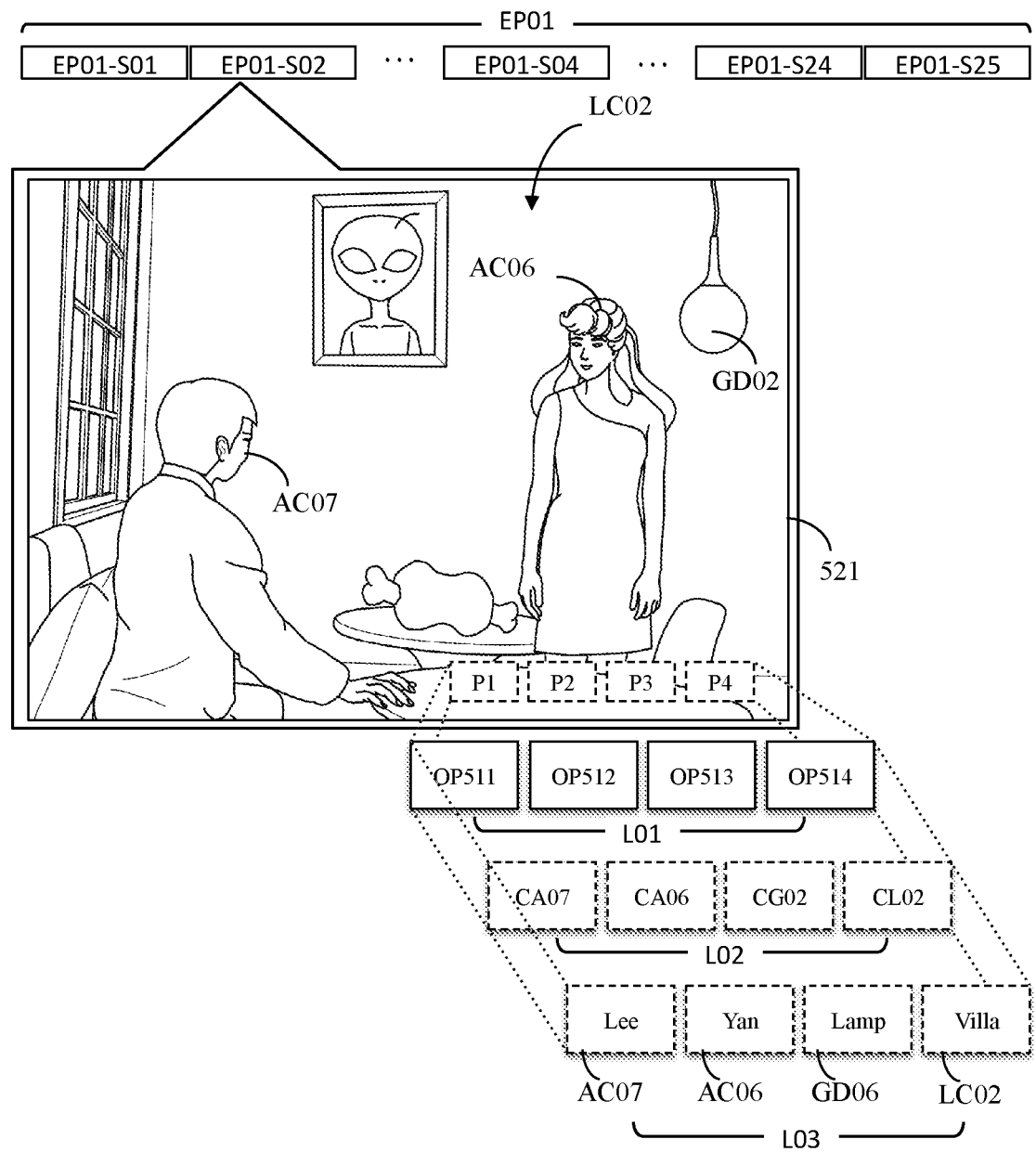
FIG. 11E illustrates an explanatory diagram of a frame of one of interactive segments of an interactive video with multiple exploded layers overlaying on the interactive options according to the fifth embodiment of the instant disclosure.

Refer to FIG. 11A, FIG. 11B, FIG. 11C and FIG. 11D, as well as FIG. 10A and FIG. 10B. FIG. 11A illustrates a flowchart of a method for transmitting and playing interactive videos EP01, EP02, EP03, EP04 . . . EP09, EP10, EP11, EP12 according to a fifth embodiment of the instant disclosure. FIG. 11B illustrates an architectural explanatory diagram of the method for linearly transmitting and playing interactive videos EP01, EP02, EP03, EP04 . . . EP09, EP10, EP11, EP12 according to the fifth embodiment of the instant disclosure. FIG. 11C illustrates an explanatory view of linear reference tables T1, T2, T3, T4 . . . T9, T10, T11, T12 utilized while linearly transmitting and playing interactive videos EP01, EP02, EP03, EP04 . . . EP09, EP10, EP11, EP12 according to the fifth embodiment of the instant disclosure. FIG. 11D illustrates an explanatory diagram of the frame 521 of one of interactive segments EP01-S01, EP01-S02, . . . , EP01-S04, . . . , EP01-S24, EP01-S25 of an interactive video EP01 according to the fifth embodiment of the instant disclosure. FIG. 11E illustrates an explanatory diagram of the frame 521 of the interactive segment EP01-S02 of the interactive video EP01 with multiple exploded layers L01, L02, L03 overlaying on the interactive options 511, 512, 513, 514 according to the fifth embodiment of the instant disclosure. In FIG. 11A, the interactive video transmitting and playing method at least comprises Steps 610, 620, 630, 640, 650, 660, in which Steps 630, 640, 650 relate to the interactive video transmitting method, while Steps 610, 620, 660 relate to the interactive video playing method.

In Step 610, display interactive options of multiple interactive videos on an interactive menu. As shown in FIG. 11B, 10A, 10B, multiple interactive videos EP01, EP02, EP03, EP04 . . . EP09, EP10, EP11, EP12 of the interactive video transmitting device 200 are stored in storing unit 210. The way to realize is that, the processing unit 330 of the viewing end device 300, 390 outputs an interactive menu (such as interactive menus MU01, MU00 shown in FIG. 13A, 13B) through the AV output unit 370, and on the interactive menu, displays interactive options of the interactive videos EP01, EP02, EP03, EP04 . . . EP09, EP10, EP11, EP12 (in FIG. 13A, 13B, the interactive options are not marked with dedicated reference numbers; instead, the reference numbers of the corresponding interactive videos are marked to have a better vision illustration) for the user's selection operation.

As shown in FIG. 11B, the interactive video EP01 comprises multiple interactive segments EP01-S01, EP01-S02 . . . EP01-S04 . . . EP01-S24, EP01-S25 with different video lengths respectively; and the interactive video EP02 comprises multiple interactive segments EP02-S01, EP02-S02 . . . EP02-S06 . . . EP02-S26, EP02-S27 with different video lengths respectively; the interactive video EP03 comprises multiple interactive segments EP03-S01, EP03-S02 . . . EP03-S05 . . . EP03-S23, EP03-S24 with different video lengths respectively; the interactive video EP04 comprises multiple interactive segments EP04-S01, EP04-S02 . . . EP04-S07 . . . EP04-S32, EP04-S33 with different video lengths respectively; the interactive video EP09 comprises multiple the interactive segments EP09-S01, EP09-S02 . . . EP09-S06 . . . EP09-S26, EP09-S27 with different video lengths respectively; the interactive video EP10 comprises multiple interactive segments EP10-S01, EP10-S02 . . . EP10-S05 . . . EP10-S23, EP10-S24 with different video lengths respectively; the interactive video EP11 comprises multiple interactive segments EP11-S01, EP11-S02 . . . EP11-S08 . . . EP11-S27, EP11-S28 with different video lengths respectively; the interactive video EP12 comprises multiple interactive segments EP12-S01, EP12-S02 . . . EP12-S09 . . . EP12-S29, EP12-S30 with different video lengths respectively.

In step 620, receive and transmit a control signal indicating a first interactive video is selected. What the user selects may be one of the interactive videos EP01, EP02, EP03, EP04 . . . EP09, EP10, EP11, EP12. The user conducts a selecting operation via the remote receiving unit 380 or input unit 381, and the control signal that the processing unit 330 receives through the remote receiving unit 380 or input unit 381, indicates the user selects a certain one of the interactive videos EP01, EP02, EP03, EP04 . . . EP09, EP10, EP11, EP12 as the first interactive video. The control signal will be transmitted to the interactive video transmitting device 200 by the signal transmitting unit 360 or the network unit 351 under the control of the processing unit 330. If the user does not select a signal one of the interactive videos EP01, EP02, EP03, EP04 . . . EP09, EP10, EP11, EP12, but select to play all, then the step 610 is not absolutely necessary; or if the viewing end device 300, 390 automatically plays from the time point where the previous viewing operation terminated, then steps 610, 620, 630 are not absolutely necessary. Base on the previous playing record stored in the viewing end device 300, 290 or the interactive video transmitting system 200, the playing operation may be conducted accordingly.

In step 630, receive the control signal selecting the first interactive video. The processor 250 of the interactive video transmitting device 200 receives the control signal selecting the first interactive video through the communicating unit 220.

In step 640, generate a linear playlist. Said linear playlist is, based on the orders in a linear video playing sequence ES01 and multiple linear segment playing sequences SS01, SS02, SS03, SS04 . . . SS09, SS10, SS11, SS12, to arrange the playing orders for the interactive videos EP01, EP02, EP03, EP04 . . . EP09, EP10, EP11, EP12 and their interactive segments EP01-S01, EP01-S02 . . . EP01-S04 . . . EP01-S24, EP01-S25, EP02-S01, EP02-S02 . . . EP02-S06 . . . EP02-S26, EP02-S27, EP03-S01, EP03-S02 . . . EP03-S05 . . . EP03-S23, EP03-S24, EP04-S01, EP04-S02 . . . EP04-S07 . . . EP04-S32, EP04-S33, EP09-S01, EP09-S02 . . . EP09-S06 . . . EP09-S26, EP09-S27, EP10-S01, EP10-S02 . . . EP10-S05 . . . EP10-S23, EP10-S24, EP11-S01, EP11-S02 . . . EP11-S08 . . . EP11-S27, EP11-S28, EP12-S01, EP12-S02 . . . EP12-S09 . . . EP12-S29, EP12-S30.

In other words, in a linear playing mode (such as when a first interactive video is selected), the processor 250 of the interactive video transmitting device 200, based on the linear video playing sequence ES01 and the linear segment playing sequences SS01, SS02, SS03, SS04 . . . SS09, SS10, SS11, SS12, retrieves the interactive videos EP01, EP02, EP03, EP04 . . . EP09, EP10, EP11, EP12 in the storing unit 210 and transmits to the viewing end device 300, 390 accordingly. And the viewing end device 300, 390, under the linear playing mode, receives and plays in the order of the interactive videos EP01, EP02, EP03, EP04 . . . EP09, EP10, EP11, EP12. The playing order that the linear video playing sequence ES01 comprises is in the sequence of: the interactive videos EP01, EP02, EP03, EP04 . . . EP09, EP10, EP11, EP12. As to the interactive video EP01, the playing order for the linear segment playing sequence SS01 is in the sequence of: the interactive segments EP01-S01, EP01-S02 . . . EP01-S04 . . . EP01-S24, EP01-S25. As to the interactive video EP02, linear segment playing sequence SS02 is in the sequence of: the interactive segments EP02-S01, EP02-S02 . . . EP02-S06 . . . EP02-S26, EP02-S27. As to the interactive video EP03, linear segment playing sequence SS03 is in the sequence of: the interactive segments EP03-S01, EP03-S02 . . . EP03-S05 . . . EP03-S23, EP03-S24. As to the interactive video EP04, linear segment playing sequence SS04 is in the sequence of: the interactive segments EP04-S01, EP04-S02 . . . EP04-S07 . . . EP04-S32, EP04-S33. As to the interactive video EP09, linear segment playing sequence SS09 is in the sequence of: the interactive segments EP09-S01, EP09-S02 . . . EP09-S06 . . . EP09-S26, EP09-S27. As to the interactive video EP10, linear segment playing sequence SS10 is in the sequence of: the interactive segments EP10-S01, EP10-S02 . . . EP10-S05 . . . EP10-S23, EP10-S24. As to the interactive video EP11, linear segment playing sequence SS11 is in the sequence of: the interactive segments EP11-S01, EP11-S02 . . . EP11-S08 . . . EP11-S27, EP11-S28. As to the interactive video EP12, linear segment playing sequence SS12 is in the sequence of: the interactive segments EP12-S01, EP12-S02 . . . EP12-S09 . . . EP12-S29, EP12-S30.

In FIG. 11C, the aforesaid linear playlist may be formed by a part of or all of multiple linear reference tables T1, T2, T3, T4 . . . T9, T10, T11, T12, all of which may be stored in the storing unit 210 of the interactive video transmitting device 200, and each of which corresponds to the interactive videos EP01, EP02, EP03, EP04 . . . EP09, EP10, EP11, EP12 respectively. To facilitate better illustration and description, the linear reference table T1 is partially omitted. Each of the linear reference tables T1, T2, T3, T4 . . . T9, T10, T11, T12 comprises columns of "play order", "interactive segment identifier", "interactive video identifier", "start time", "end time", "interactive option color", "video element type", "video element identifier" and "display weighting". The information of the columns in each of the linear reference tables T1, T2, T3, T4 . . . T9, T10, T11, T12 may be a part of the interactive menu information mentioned in previous embodiments. The following column definitions apply to all the linear reference tables T1, T2, T3, T4 . . . T9, T10, T11 and T12.

The information of the "play order" column corresponds to the playing order according to the linear segment playing sequence SS01, which may be deemed as an approach to realize the linear segment playing sequence SS01.

The information of the "interactive segment identifier" column is an independent identity reference for each of the interactive segments EP01-S01, EP01-S02 . . . EP01-S04 . . . EP01-S24, EP01-S25 of the interactive video EP01.

The information of the "interactive video identifier" column is the "interactive video identifier" of the interactive video EP01 corresponding to the interactive segments EP01-S01, EP01-S02 . . . EP01-S04 . . . EP01-S24, EP01-S25.

The information of the "start time" column is the time point to play each of the interactive segments EP01-S01, EP01-S02 . . . EP01-S04 . . . EP01-S24, EP01-S25; the information of the "end time" column is the time point to terminate playing of the interactive segments EP01-S01, EP01-S02 . . . EP01-S04 . . . EP01-S24, EP01-S25.

The information of the "video element type" column is the type of the video element shown on each of the interactive options (such as in FIG. 11D, the interactive options 511, 512, 513, 514) of each of the interactive segments EP01-S01, EP01-S02 . . . EP01-S04 . . . EP01-S24, EP01-S25, such as role, merchandise, location, or as in FIG. 4, FIG. 11D, the "Cloth" displayed on the interactive option 511 on the frame 521, the "Ornament" shown on the interactive option 512, the "Property" shown on the interactive option 513, the "Premium" shown on the interactive option 514, or as in FIG. 5, the "Ornament" shown on the frame 522 of the interactive option 511, the "Location" shown on the interactive option 512, the "Cloth" shown on the interactive option 513, the "Property" on the interactive option 514, or as in FIG. 6, the "History" shown on the frame 523 of the interactive option 511, the "MAP" shown on the interactive option 512, the "Weather" shown on the interactive option 513, and the "Premium" shown on the interactive option 514, etc. In the embodiments of the instant disclosure, each video element and video element identifier corresponds to a certain visible object (comprises: the roles, cloths, properties, merchandises, locations, etc. being present on site when shooting the original videos; or the additional computer graphic planar, three dimensional objects, voices over actors/actresses or background sounds edited to the original videos in the post production of the original videos, or automatically attaching thereon in the playing process), and such visible objects are respectively shown in each frame of each of the interactive segments of each of interactive videos, and the types of which are introduced in the aforesaid paragraphs. However, not every visible element would be involved in each and every linear reference table.

The information of the "video element identifier" column is the individual identity for the aforesaid video element. For instance, in FIG. 11D, some frame 512 of the interactive segments EP01-S02 of the interactive video EP01 at least displays a role AC07 (Role Title: "Lee"), role AC06 (Role Title: "Yan"), merchandise GD02 (Merchandise Title: "Lamp"), location LC02 (Location Title: "villa") as four video elements, in which "AC07", "AC06", "GD02", "LC02" are respectively the "video element identifier" of the four video elements role "Lee", role "Yan", merchandise "Lamp", location "villa" involved in the linear reference table T1. Aside from the "video element identifier" column, each of the linear reference tables T1, T2, T3, T4 . . . T9, T10, T11, T12 may comprise an extra column with information of "video element title" corresponding to the information of the "video element identifier" column. The information of "video element title" or "video element identifier" column may be used to display on the interactive options 511, 512, 513, 514 in FIG. 4, FIG. 11D. When a "video element title" or "video element identifier" is associated with an "interactive segment identifier", means that not only the video element corresponded to the "video element title" or "video element identifier" is shown on the interactive segment corresponding to the certain "interactive segment identifier", but the "video element title" or "video element identifier" will also be displayed on the interactive options associated with the interactive segment corresponded to the "interactive segment identifier". In some embodiments, the video element title may be utilized as the video element identifier. In some embodiments, any "identifier" used to represent any of the interactive videos, interactive segments, interactive options and video elements, namely the interactive video identifiers, interactive segment identifiers, interactive option identifiers and video element identifier, may be assigned as the title, identity code or image or any other related information (such as the color information of the interactive options) to be involved in the linear reference table, nonlinear reference table or displayed on the interactive options. The aforesaid title may be text; the identity code may comprises computer readable and displayable alphanumeric and/or other characters/symbols; the image may be any image file in any computer readable and displayable format. If necessary, each of the frames comprised in an interactive segment may be assigned with a frame identifier for more detailed interactive controls.

The information of the "interactive option color" column is the color of each of the interactive options (such as the interactive options 511, 512, 513, 514 in FIG. 4, FIG. 11D) each corresponded (displayed) "video element identifier" thereto respectively. The colors of the interactive options 511, 512, 513, 514 in FIG. 4, FIG. 11D may be the four colors red, green, yellow and blue. However, even though each of the interactive segments EP01-S01, EP01-S02 . . . EP01-S04 . . . EP01-S24, EP01-S25 has the same numbers of interactive option colors, for instance the four colors red, green, yellow and blue, each interactive option color may correspond to a signal or multiple video element identifiers. For instance, the four interactive option colors red, green yellow and blue of the interactive segment EP01-S01, correspond respectively to the four video element identifiers AC06, AC11, GD03, LC01. However, the interactive segment EP01-S02 has the same four interactive option colors such as red, green yellow and blue, correspond to six video element identifiers AC07, AC04, AC03, AC06, GD02, LC02; which the video element identifiers AC04, AC03, AC06 are all corresponded to the interactive option color green. That means, in the duration of playing the interactive segment EP01-S02, the video element identifiers AC04, AC03, AC06 or the corresponding video element titles are display in-turn on the green interactive option (such as the interactive option 512 in FIG. 4, FIG. 11D). The color information of the "interactive option color" column may be used as the "interactive options identifier" for each of the interactive options 511, 512, 513, 514 in FIG. FIG. 4, FIG. 11D.

The information of the "display weighting" column is the time percentage data that each of the video elements displayed on the interactive options (such as the interactive options 511, 512, 513, 514 in FIG. 4, FIG. 11D) in the duration of the interactive segment (such as the interactive segment EP01-S01). When multiple video element identifiers correspond to a signal interactive option (or interactive option color), for instance, in FIG. 11D, the video element identifiers AC04, AC03, AC06 in the interactive segment EP01-S01 corresponding to the same green interactive option, that means, in the duration of the interactive segment EP01-S02 (from the start time 00.02.22.19 to the end time 00.04.42.09; 2 minutes 19 seconds 50 in total), the video element identifiers AC04, AC03, AC06 or the corresponding video element titles are shown in-turn in the green one of the interactive options (such as the interactive option 512 in FIG. 4, FIG. 11D). The display weighting 40 corresponded to the video element identifier AC04, represents that the video element identifier AC04, in the 2 minutes 19 seconds 50 duration of playing the interactive segment EP01-S02, will be displayed on the interactive option 512 for 40% of said duration; similarly, the same display weighting 40 corresponding to the video element identifier AC03, represents that the video element identifier AC03, in the 2 minutes 19 seconds 50 duration of playing interactive segment EP01-S02, will be displayed on the interactive option 512 for another 40% of said duration; and finally, the display weighting 20 corresponded to the video element identifier AC06, represents that video element identifier AC06, in the 2 minutes 19 seconds 50 duration of playing the interactive segment EP01-S02, will be displayed on the interactive option 512 for the rest 20% of said duration. The display weighting of each video element (video element identifier or video element title, for instance video element identifier AC06 or video element title "Yan") on a certain interactive options (such as the interactive option 512 in FIG. 4, FIG. 11D), may be changed from time to time according to different user behaviors. Additional columns with time information of the exact start time and end time of displaying each of the video element identifiers AC04, AC03, AC06 on the interactive option 512 in the duration of playing the interactive segment EP01-S02, may be involved in the linear reference table T1 so as to be used for precisely retrieving/transmitting by the interactive video transmitting device 200 and receiving/playing on the viewing end device 300, 390.

The rest of the linear reference tables T2, T3, T4 . . . T9, T10, T11, T12 comprises the columns and data structures similar to the linear reference table T1. Although for the conveniences of better disclosure, the data structures of linear reference tables T1, T2, T3, T4 . . . T9, T10, T11, T12 are illustrated in the format of matrix tables, based on the different database application programs utilized in the storing unit 210, the linear reference tables T1, T2, T3, T4 ... T9, T10, T11, T12 may have realizable different data structures.

In addition, in some embodiments, if a complete linear playlist comprising the entire interactive videos EP01, EP02, EP03, EP04 ... EP09, EP10, EP11, EP12 is already stored in the storing unit 210, the processor 250 needs only to retrieve it from the storing unit 210 for reference; namely the step 640 is not absolutely necessary.

In FIG. 11E, the interactive segment EP01-S02 of the interactive video EP01 comprises multiple exploded layers L01, L02, L03 overlaying on areas P1, P2, P3, P4 on the frame 521 thereof to form interactive options 511, 512, 513, 514. The layer L01 comprises interactive option images OP511, OP512, OP513, OP514, respectively corresponding to the areas P1, P2, P3, P4 of the frame 521; the layer L02 comprises commands CA07, CA06, CG02, CL02, respectively corresponding to the interactive option images OP511, OP512, OP513, OP514 of the layer 01, and to the areas P1, P2, P3, P4 of the frame 521; and the layer L03 comprises video element identifiers AC07, AC06, GD02, LC02 (the video element titles "Lee", "Yang", "Lamp", "Villa" are illustrated as the video element identifiers herein), respectively corresponding to the commands CA07, CA06, CG02, CL02 of the layer 02, to the interactive option images OP511, OP512, OP513, OP514 of the layer 01, and to the areas P1, P2, P3, P4 of the frame 521.

The interactive option images OP511, OP512, OP513, OP514 of the layer 01, and the related information thereof (such as image file names, image sizes, display positions, etc.) may be stored in the memory unit 340 of the viewing end device 300/390, and may be displayed, according to a display control signal of the interactive video transmitting device 200, on the areas P1, P2, P3, P4 of the frame 521 of the interactive segment EP01-S02 of the interactive video EP01; alternatively, the interactive option images OP511, OP512, OP513, OP514 may be stored in the storing unit 210 of the interactive video transmitting device 200 and, accompanying with the display control signal of the interactive video transmitting device 200, be retrieved and transmitted to the viewing end device 300/390 for further receiving and displaying operations.

The commands CA07, CA06, CG02, CL02 of the layer 02 comprise program codes selected from the group consisting of the following: which interactive option to correspond, which area on the frame to correspond, control of displaying which video element identifier, duration for displaying (even the start time and end time for displaying), upon being selected which interactive menu to display or which interactive operation to conduct, etc. The commands CA07, CA06, CG02, CL02 may be stored in the memory unit 340 of the viewing end device 300/390, and may be enabled, according to a display control signal of the interactive video transmitting device 200, on the interactive option images OP511, OP512, OP513, OP514 on the areas P1, P2, P3, P4 of the frame 521 of the interactive segment EP01-S02 of the interactive video EP01; alternatively, the commands CA07, CA06, CG02, CL02 may be stored in the storing unit 210 of the interactive video transmitting device 200 and, accompanying with the display control signal of the interactive video transmitting device 200, be retrieved and transmitted to the viewing end device 300/390 for further receiving and enabling operations.

The video element identifiers AC07, AC06, GD02, LC02 of the layer 03, and the related information (such as video element titles, video element images or video element identity codes, etc.) may be stored in the memory unit 340 of the viewing end device 300/390, and may be displayed, according to a display control signal of the interactive video transmitting device 200, on the interactive option images OP511, OP512, OP513, OP514 on the areas P1, P2, P3, P4 of the frame 521 of the interactive segment EP01-S02 of the interactive video EP01, and respectively corresponding to the commands CA07, CA06, CG02, CL02; alternatively, the video element identifiers AC07, AC06, GD02, LC02 may be stored in the storing unit 210 of the interactive video transmitting device 200 and, accompanying with the display control signal of the interactive video transmitting device 200, be retrieved and transmitted to the viewing end device 300/390 for further receiving and displaying operations.

In FIG. 11E, the layers L01, L02, L03, and the interactive option images OP511, OP512, OP513, OP514, the commands CA07, CA06, CG02, CL02, and the video element identifiers AC07, AC06, GD02, LC02 thereof, are illustrated as a layer stack structure for better disclosure of technical features. However, in different program applications, the interactive option images OP511, OP512, OP513, OP514, the commands CA07, CA06, CG02, CL02, and the video element identifiers AC07, AC06, GD02, LC02 of the layers L01, L02, L03 may form another layer stack structure in a different order, or integrated on the interactive segments of the interactive videos with non-layer-stack means.

In step 650, according to the linear playlist, orderly retrieve and transmitting multiple interactive segments of the first interactive video, as well as multiple display weightings of the associated video elements on each of the interactive options. The processor 250 of the interactive video transmitting device 200, according to the linear playlist, orderly retrieve the interactive segments (such as the interactive segments EP01-S01, EP01-S02 ... EP01-S04 EP01-S24, EP01-S25) of the first interactive video (such as the interactive video EP01), as well as the display weightings (such as the values 100, 40, 20 ..., etc. in the "display weighting" columns) of the associated video elements (such as the video element identifiers AC03, AC04, AC06, AC07 or video element titles "Lee", "Yan", "Lamp", "Villa") on each of the interactive options (such as the red, green, yellow, blue interactive options 511, 512, 513, 514 in FIG. 4, FIG. 11D) from the storing unit 210, and then transmit towards the viewing end device 300, 390 through the communicating unit 220.

In step 660, orderly receive multiple interactive segments and multiple display weightings of the first interactive video, and display each video element on the associated interactive option of the interactive segment for a time percentage corresponding to the display weighting upon playing the interactive segment of the first interactive video. The processing unit 330 of the viewing end device 300, 390 orderly receives the interactive segments (such as the interactive segments EP01-S01, EP01-S02 ... EP01-S04 ... EP01-S24, EP01-S25) of the first interactive video (such as the interactive video EP01) and the display weightings (such as the values 100, 40, 20 ..., etc. in the "display weighting" columns) through the signal receiving unit 350 and the network unit 350, and then on the AV output 370, orderly displays each interactive segment of the first interactive video, and displays each video element (such as the video element identifiers AC03, AC04, AC06, AC07 or the video element titles "Lee", "Yan", "Lamp", "Villa") on the associated one of the interactive options (such as the red, green, yellow, blue interactive options 511, 512, 513, 514 in FIG. 4, FIG. 11D) on each of the interactive segments (such as the interactive segments EP01-S01, EP01-S02 ... EP01-S04 ... EP01-S24, EP01-S25) respectively for a time percentage of the corresponding display weighting. For instance, when playing the interactive segment EP01-S02 of the interactive video EP01, the duration of displaying the video element title "Yan" and/or the video element identifier AC06 on the interactive option 512, would match the time percentage of the corresponding display weighting 20%, namely 20% time percentage of the video length, 2 minutes 19 seconds 50 duration, of the interactive segment EP01-S02.

The aforesaid embodiments discloses display weightings that, may be utilized in controlling the display duration of displaying the video element on the interactive option, controlling the displaying probability and selectable probability, thereby controlling the illustrated contents after the selection of the interactive option, such as the various interactive menu information or interactive menus in the aforesaid embodiments, and developing the variety of interactive operations in the playing process of the interactive video.

As mentioned above, the display weighting for each video element (video element identifier or video element title, such as the video element identifier AC06 or video element title "Yan") displayed on a certain interactive options (such as the interactive option 512 in FIG. 4, FIG. 11D), may be changed according to different user operating behaviors to increase, in the subsequent interactive operations, the display probabilities of multiple merchandises or other interactive operation associated to the selected video element and interactive option. Furthermore, as each interactive video is divided into multiple interactive segments; said interactive segments are stored in the format of independent digital files, and assigned with certain interactive segment identifiers, thereby facilitating a nonlinear playback with several interactive segments jointly comprising a selected video element by the inquiry for its video element identifier and the associated interactive segment identifiers on each linear reference table.

Figure 12A:
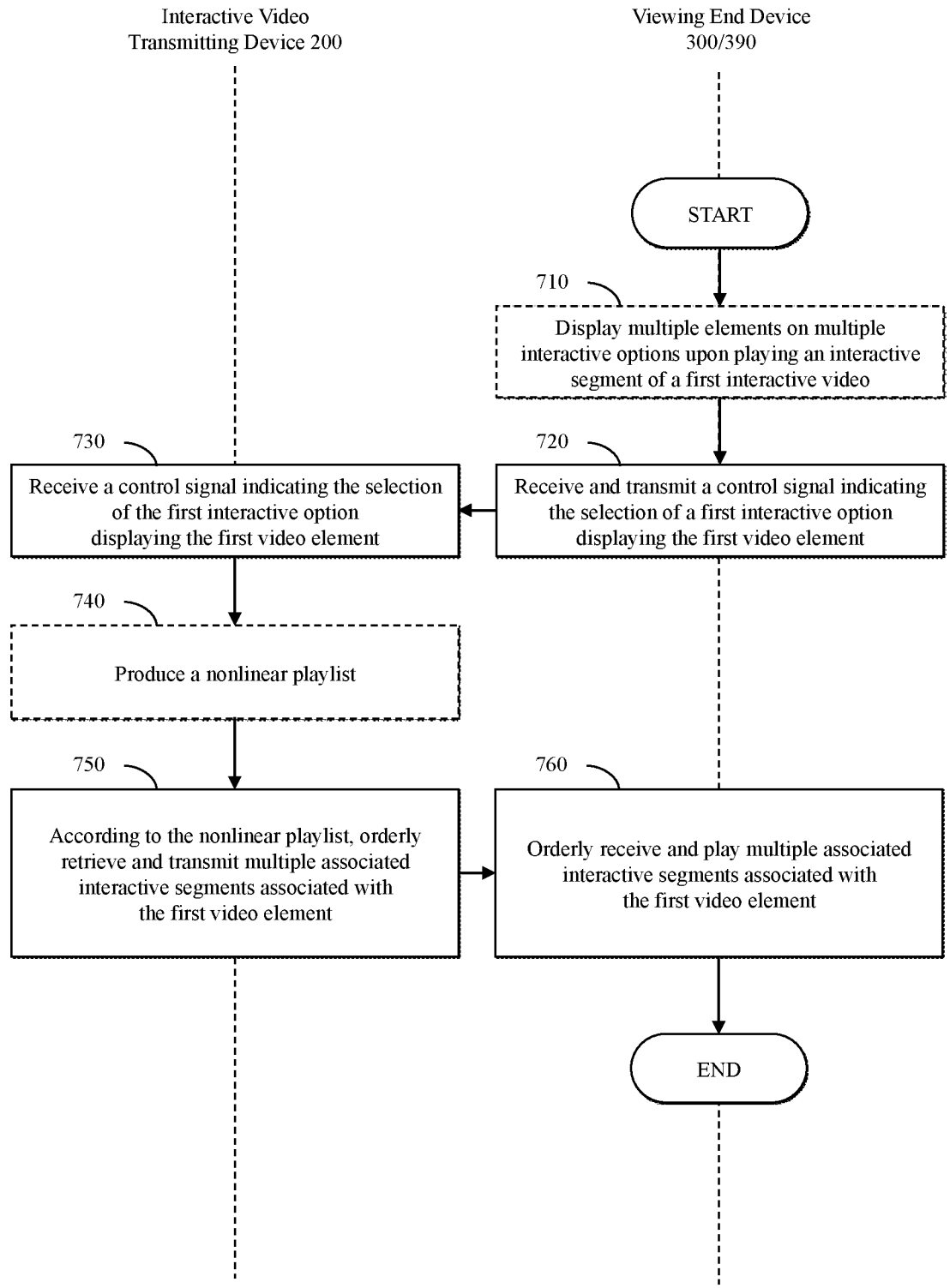
FIG. 12A illustrates a flowchart of a method for transmitting and playing interactive videos according to a sixth embodiment of the instant disclosure.
Figure 12B:
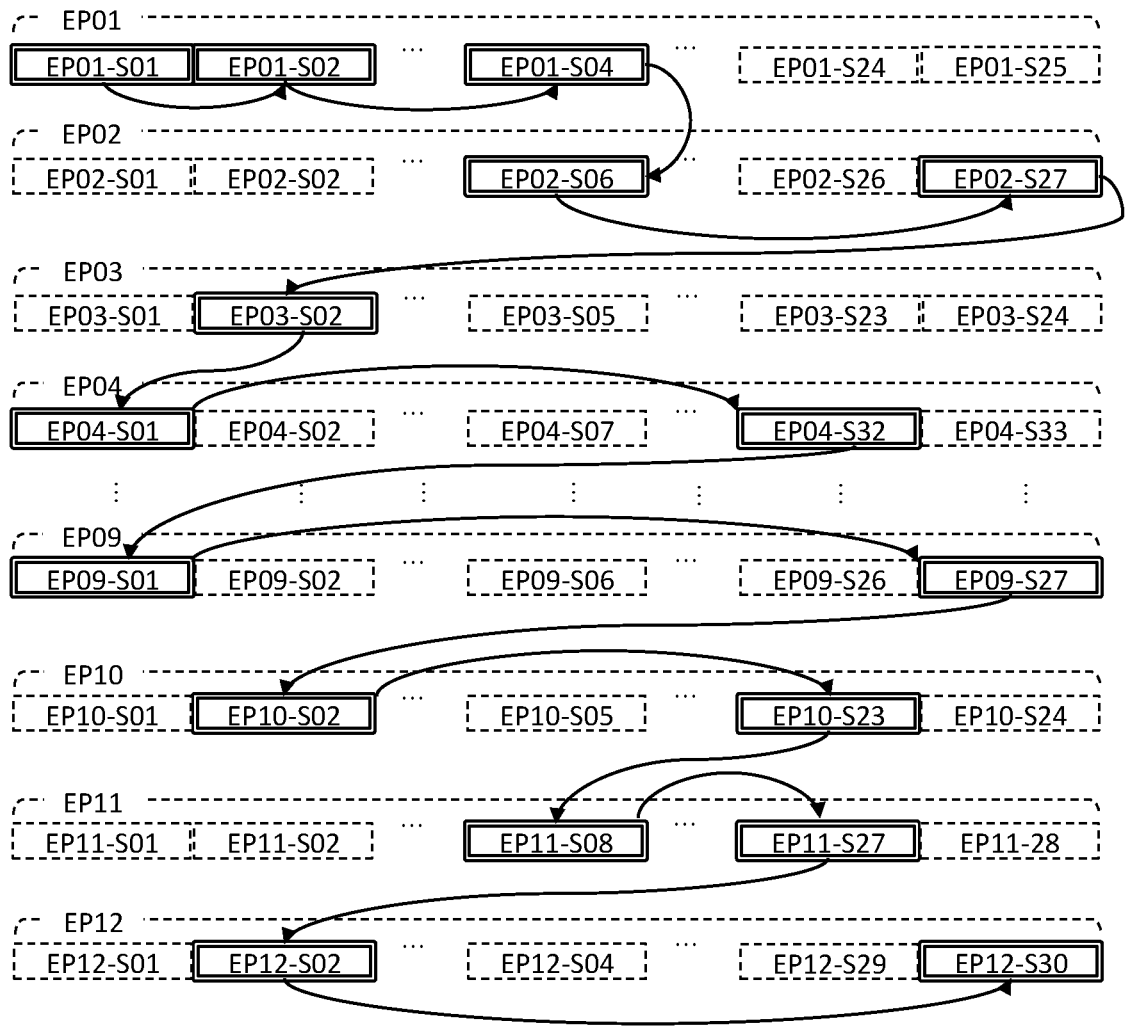
FIG. 12B illustrates an architectural explanatory diagram of the method for nonlinearly transmitting and playing interactive videos according to the sixth embodiment of the instant disclosure.
Figure 13A:
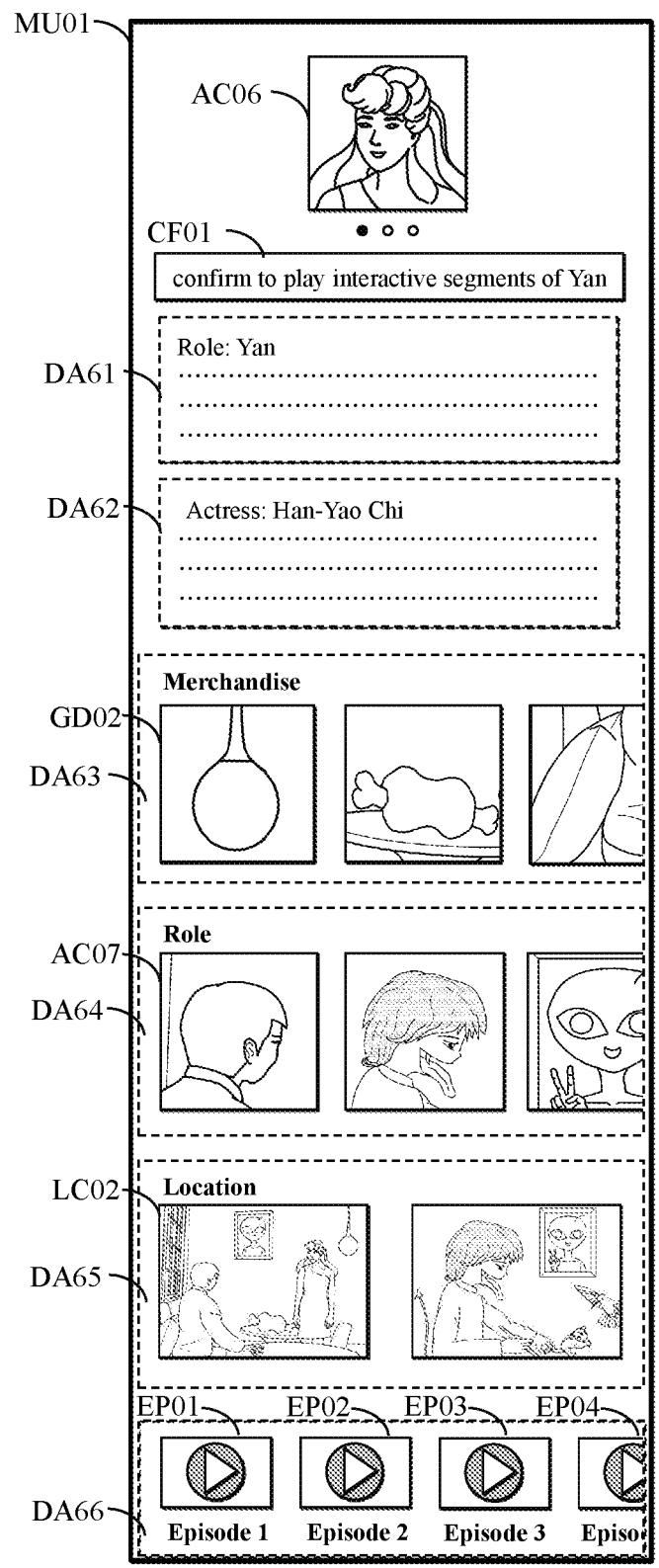
FIG. 13A illustrates an explanatory view of an interactive menu displayed on a viewing end device according to a seventh embodiment of the instant disclosure.
Figure 13B:
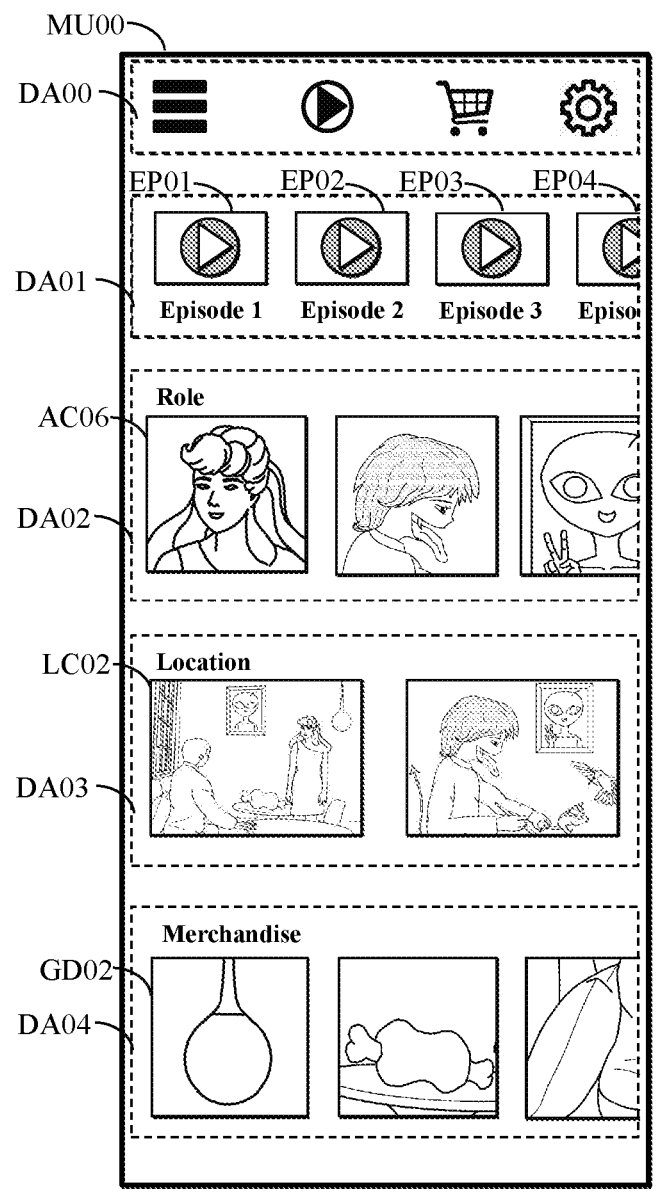
FIG. 13B illustrates an explanatory view of another interactive menu displayed on the viewing end device according to the seventh embodiment of the instant disclosure.

Refer to FIG. 12A, FIG. 12B, FIG. 12C, and FIG. 13A and FIG. 13B. FIG. 12A illustrates a flowchart of a method for transmitting and playing interactive videos according to a sixth embodiment of the instant disclosure. FIG. 12B illustrates an architectural explanatory diagram of the method for nonlinearly transmitting and playing interactive videos according to the sixth embodiment of the instant disclosure. FIG. 12C illustrates an explanatory view of a nonlinear reference tables utilized while nonlinearly transmitting and playing interactive videos according to the sixth embodiment of the instant disclosure. FIG. 13A illustrates an explanatory view of an interactive menu displayed on a viewing end device according to a seventh embodiment of the instant disclosure. FIG. 13B illustrates an explanatory view of another interactive menu displayed on the viewing end device according to the seventh embodiment of the instant disclosure. The interactive video transmitting and playing method in FIG. 12A at least comprises steps 710, 720, 730, 740, 750, 760, wherein the steps 730, 740, 750 are related to an interactive video transmitting method, and the steps 710, 720, 760 are related to an interactive video playing method.

In step 710, display multiple elements on multiple interactive options upon playing a interactive segment of a first interactive video. When the processing unit 330 of the viewing end device 300, 390 plays an interactive segment (such as the interactive segment EP01-S02 in FIG. 11B, 11C, 11D) of the first interactive video (such as interactive video EP01 in FIG. 11B, 11C, 11D 之 ) through the AV output unit 370, the processing unit 330 displays multiple video elements (such as in FIG. 11D, the role of the video element identifier AC07 (video element title "Lee"), the role of the video element identifier AC06 (video element title "Yan"), the merchandise of the video element identifier GD02 (video element title "Lamp"), and the location of the video element identifier LC01 (video element title "Villa") on multiple interactive options (such as the interactive options 511, 512, 513, 514 in FIG. 4, FIG. 11D).

In step 720, receive and transmit a control signal indicating the selection of a first interactive option displaying the first video element. The processing unit 330 of the viewing end device 300, 390 receives a control signal through the remote receiving unit 380 or input unit 381, and then transmits the control signal through the signal transmitting unit 360 or network unit 351 to the interactive video transmitting device 200, in which the control signal indicates: the first interactive option (such as the interactive option 512 in FIG. 11D) displaying a first video element (such as in FIG. 11D, the role of the video element identifier AC06 (video element title "Yan")) is selected.

If necessary, the step 720 may comprise a step of receiving and transmitting a confirmation signal, wherein the confirmation signal indicates the playing of multiple associated interactive segments associated to the aforesaid first video element (introduced in the following descriptions). The aforesaid confirmation signal, for instance, may take place upon the click selection of a confirmation option CF01 "confirm to play interactive segments of "Yan"" (on-screen virtual button) on the interactive menu MU01 in FIG. 13A. The interactive menu MU01 in FIG. 13A may illustrate various interactive menu information, comprising text, numbers, symbols, images with and/or without links or function definitions, or vertical and/or lateral scroll interfaces, etc. In some embodiments, the step 720 further comprises a step of displaying an interactive menu (such as the interactive menu MU01). The interactive menu MU01 is a vertical scroll interface displayed on the viewing end device 300/390, which comprises: a corresponding image of the first video element (namely in FIG. 13A, the video element (identifier) AC06) displaying on the first interactive option (such as in FIG. 11D, the interactive option 512) selected in the step 720, the confirmation option CF01, the profile information of the first video element (Role) displayed in a display area DA61, the profile information (Actor) of the actor/actress performing the first video element (Role) displayed in a display area DA62, multiple image options corresponded to video elements (identifier) GD02 . . . with another video element type (Merchandise) as a lateral scroll interface displayed in a display area DA63, multiple image options corresponded to video elements (identifier) AC07 . . . with another video element type (Role) as a lateral scroll interface displayed in a display area DA64, multiple image options corresponded to video elements (identifier) LC05 . . . with another video element type (Location) as a lateral scroll interface displayed in a display area DA65, and displayed in display area DA66, multiple image options corresponded to multiple interactive videos EP01, EP02, EP03, EP04.

In another embodiment, comparing to the step 710, the first interactive option displaying the first video element may not be displayed in a in-play interactive segment; instead, the first interactive option may be displayed in an interactive menu. For example, in FIG. 13B, the image option of the video element (identifier) AC06 displayed in the interactive menu MU00 may be utilized as the first interactive option multiple image options corresponded to video elements (identifier) AC07 . . . with another video element type (Role) as a lateral scroll interface displayed in a display area DA64.

When the image option of the video element (identifier) AC06 (i.e. the first video element) displayed in the interactive menu MU00 as the first interactive option is selected, the control signal in the step 720 may be generated. Therefore, aside from the step 710, the image option displayed in the interactive menu MU00 in FIG. 13B also allows the selection to enter the nonlinear playing mode.

In addition, in some embodiments, the memory unit 340 of the viewing end device 300/390 stores program codes comprising installed application program product, the interactive menu MU00 in FIG. 13B may be the homepage displayed on the AV output unit 370 when the processing unit 330 executes the application program product. The interactive menu MU00 is a vertical scroll interface displayed on the viewing end device 300/390, which comprises the function bar with multiple image options displayed in a display area DA00, image options corresponding to the interactive videos EP01, EP02, EP03, EP04 as a lateral scroll interface displayed in a display area DA01, image options corresponding to multiple video elements (identifier) AC06 . . . of one video element type (Role) as a lateral scroll interface displayed in display area DA02, image options corresponding to multiple video elements (identifier) GD02 . . . of one video element type (Merchandise) as a lateral scroll interface displayed in display area DA03, and image options corresponding to multiple video elements (identifier) LC02 . . . of one video element type (Location) as a lateral scroll interface displayed in display area DA03. This means, the user may enter the interactive segments corresponding to or associated with the desired certain video element from selecting the interactive options displaying various video elements in the interactive menu right from the very beginning; aside from the general linear playing mode, such interactive options for nonlinear playing are also provided to the user.

In step 730, receive a control signal indicating the selection of the first interactive option displaying the first video element. The processor 250 of the interactive video transmitting device 200 receives, through the communicating unit 220, the control signal from the viewing end device 300, 390. Such control signal indicates: the first interactive option (such as the interactive option 512 in FIG. 11D) displaying the first video element (such as in FIG. 11D, the role of the video element identifier AC06 (video element title "Yan")) is selected.

In step 740, produce a nonlinear playlist Tnlr. Refer to FIG. 12B and FIG. 12C, the nonlinear playlist Tnlr is reassembled from the linear reference tables T1, T2, T3, T4 . . . T9, T10, T11, T12, mainly by removing the unassociated interactive segments (such as the interactive segments EP01-S24, EP01-S25, EP02-S01, EP02-S02, EP02-S26, EP03-S01, EP03-S05, EP03-S23, EP03-S24, EP04-S02, EP04-S07, EP04-S33, EP09-S02, EP09-S06, EP09-S26, EP10-S01, EP10-S05, EP10-S24, EP11-S01, EP11-S02, EP11-S28, EP12-S01, EP12-S04, EP12-S29) not associated with the first video element (such as in FIG. 11D, the role of the video element identifier AC06 (video element title "Yan")) and/or integrating the associated interactive segments (such as the interactive segments EP01-S01, EP01-S01, EP01-S01, EP02-S06, EP02-S27, EP03-S02, EP04-S01, EP04-S32, EP09-S01, EP09-S27, EP10-S02, EP10-S23, EP11-S08, EP11-S27, EP12-S02, EP12-S30) associated with the first video element (such as in FIG. 11D, the role of the video element identifier AC06 (video element title "Yan")). Being associated with the first video element or not, depends on whether the first video element's video element identifier (such as the title, identity code, image (information) of the video element) is shown in certain columns associated with some interactive segments in the linear reference tables T1, T2, T3, T4 . . . T9, T10, T11, T12. Integrating the associated interactive segments associated with the first video element into the nonlinear playlist Tnlr, is based on the sequence of the associated interactive segments in the original linear video playing sequence ES01 and the linear segment playing sequences SS01, SS02, SS03, SS04 . . . SS09, SS10, SS11, SS12. For instance, in FIG. 12C, the play order associated with the role of the video element identifier AC06 (video element title "Yan"), is based in the order following the arrows in FIG. 12B, started from the interactive segment EP01-S01, and then followed orderly the interactive segments EP01-S01, EP01-S01, EP02-S06, EP02-S27, EP03-S02, EP04-S01, EP04-S32, EP09-S01, EP09-S27, EP10-S02, EP10-S23, EP11-S08, EP11-S27, EP12-S02, and ended at the interactive segment EP12-S30. Such order bases on the linear video playing sequence ES01 and the linear segment playing sequences SS01, SS02, SS03, S504 . . . SS09, SS10, SS11, SS12 in which the associated interactive segments (see FIG. 12B) are arranged in sequence. The processor 250 of the interactive video transmitting device 200 bases on the first video element's video element identifier (such as the title, identity code, image (information) of the video element), and inquires in the linear reference tables T1, T2, T3, T4 . . . T9, T10, T11, T12 for the interactive segments (such as the interactive segments EP01-S01, EP01-S01, EP01-S01, EP02-S06, EP02-S27, EP03-S02, EP04-S01, EP04-S32, EP09-S01, EP09-S27, EP10-S02, EP10-S23, EP11-S08, EP11-S27, EP12-S02, EP12-S30) associated with the first video element's video element identifier (such as the title, identity code, image (information) of the video element); and then the processor 250 bases on the linear video playing sequence ES01 and the linear segment playing sequences SS01, SS02, SS03, S504 . . . SS09, SS10, SS11, SS12 in which the associated interactive segments (see FIG. 12B) are arranged in sequence, to integrate the associated interactive segments into the nonlinear playlist in FIG. 12C. The production of the nonlinear playlist Tnlr may be completed in advance for each and every video element, in which circumstances the production step herein is not necessary.

In step 750, according to the nonlinear playlist Tnlr, orderly retrieve and transmit multiple associated interactive segments associated with the first video element. The processor 250 of the interactive video transmitting device 200 bases on the nonlinear playlist Tnlr to orderly retrieve and transmit multiple associated interactive segments (such as the interactive segments EP01-S01, EP01-S01, EP01-S01, EP02-S06, EP02-S27, EP03-S02, EP04-S01, EP04-S32, EP09-S01, EP09-S27, EP10-S02, EP10-S23, EP11-S08, EP11-S27, EP12-S02, EP12-S30) associated with the first video element (such as in FIG. 11D, the role of the video element identifier AC06 (video element title "Yan")).

In step 760, orderly receive and play multiple associated interactive segments associated with the first video element. The processing unit 330 of the viewing end device 300, 390 orderly receives multiple associated interactive segments associated with the first video element from the interactive video transmitting device 200 through the signal receiving unit 350 and network unit 351 respectively. Thus, the embodiment extends outside the rigid linear playing mode, to transmit and play the associated interactive segments according to the selected video element. In some embodiments, the entire nonlinear playlist, or alternatively only the first video element identifier of the first video element and a second interactive segment identifier among the associated interactive segments (assuming the first interactive segment is played on the viewing end device 300, 390 or displayed as an image option in an interactive menu), may be transmitted to the viewing end device 300/390, to receive and display the associated interactive segments accordingly.

Aside from achieving the nonlinear playback, after entering the nonlinear playing mode, the display weighting of the first video element displaying on the interactive option may be further changed, thereby increasing, in the subsequent interactive operations, the presence probability of various merchandises or other interactive operations associated with the selected video element. In some embodiments, the realizable approach is that, for instance, the step 750 further comprised a step of changing and transmitting the display weighting(s) of the first video element displaying on the interactive options of the associated interactive segments. For instance, comparing FIG. 11C to FIG. 12C, originally in the interactive segment EP01-S02, the display weighting of the video element identifier AC06 displaying on the interactive option 512 in FIG. 11D (the interactive option color is green in FIG. 11C) is only 20(%), while the display weightings of the video element identifiers AC04, AC03 corresponding to the same interactive option 512 (the interactive option color is green in FIG. 11C) are both 40(%). After entering the nonlinear playing mode, the interactive option 512 in FIG. 11D (the interactive option color is green in FIG. 11C) corresponds to the video element identifier AC06 with a changed display weighting 100(%), higher than its original value in the linear reference table T1; meanwhile the video element identifiers AC04, AC03 have their display weightings decrease to 0(%). So the viewing end device 300, 390 may receives multiple display weightings, wherein the first and second display weightings of the first video element in different interactive segment are increased, while a third display weighting of a third video element corresponding to the same interactive option on the same interactive segment is decreased, not only lower than its original value in the linear reference table T1, but also lower than the first display weighting corresponded to the first video element. Therefore, under nonlinear playback, it is ensured that the first video element display a longer duration on the interactive options, so as to further execute other associated operations, for instance, displaying certain merchandises or certain interactive operations associated with the first video element.

Moreover, if the selection of the interactive options (such as interactive option 512 or the image option of the video element identifier AC06 in FIG. 13B) displaying the first video element (such as the video element identifier AC06) leads to enter the interactive menu MU01 in FIG. 13A, the image options displayed in the interactive menu MU01 may also change the display weighting of the selected first video element displayed in the interactive menu MU01, thereby providing different illustrations of menu contents, and possibilities of different display durations and selection probabilities for the interactive options, and developing nonlinear video playing technologies, for instance the technical applications in the domains of video viewing behavior database and advertisement promotion database.

In brief, according to the systems, devices and methods for transmitting and playing interactive videos introduced in the embodiments of the instant disclosure, now the interactive videos can be provided to the users for interactive operations on the interactive videos by simply operating the interactive options displayed thereon, which is applicable to various applications of video transmitting and playing technologies. In addition, by integrating the technical features disclosed in the embodiments of the instant disclosure, as each of the interactive videos are divided into interactive segments respectively stored as independent digital files and respectively assigned with dedicated interactive segment identifiers, each video elements illustrated in the interactive segments are able to associate with corresponding illustrated interactive segment(s) through video element identifiers. Furthermore, through the display weightings respectively assigned to each of the video element displayed on the interactive options, the display duration for each video element displayed on the interactive options may be further determined, thereby facilitating the control of the content being displayed accordingly after one of the interactive options is selected. Meanwhile, non-linear playback mode based on a selected video element can be realized by the embodiments of the instant disclosure, which not only extends outside the rigid linear playback mode, but also increase the presence duration of the merchandise(s) or interactive operation(s) associated with the selected video element, thereby expanding the variety of the interactively operations during the playback process of the interactive videos.

What is claimed is:

1. An interactive video transmitting device, comprising:
    a processor;
    a storing unit electrically connected with the processor, storing a program code and a plurality of interactive videos and interactive menu information, each of the interactive videos comprising a plurality of interactive segments respectively stored in the storing unit independently, a frame of each of the interactive segments respectively corresponding to a plurality of interactive options, a plurality of video elements and a plurality of display weightings, said interactive options illustrating colors corresponding to a plurality of color function keys on a remote controller, the interactive menu information comprising a plurality of commands respectively corresponding to the interactive options of the interactive segments at each time point in a timeline of the interactive videos; and
    a communicating unit electrically connected with the processor, transmitting the interactive videos and the interactive menu information to a viewing end device playing the interactive videos, the viewing end device receiving a control signal corresponding to one of the color function keys on the remote controller, and according to an in-play interactive segment upon receiving the control signal, executing one of the commands corresponding to the corresponding one of the interactive options illustrated on the in-play interactive segment with the corresponding color as the one of the color function keys on the remote controller;
    wherein the processor executes the program code to receive a control signal from the viewing end device, the control signal indicating a first interactive video of the interactive videos is selected, then the processor retrieving, and transmitting to the viewing end device through the communicating unit, the interactive segments of the first interactive video from the storing unit, as well as the corresponding interactive options, the corresponding video elements and the corresponding display weightings;
    wherein when the viewing end device plays the interactive segment of the first interactive video, the interactive options corresponding to the interactive segment are displayed on the interactive segment, and the video elements corresponding to the interactive segment are respectively displayed on corresponding interactive options for portions of a time of a duration of the interactive segment, said display weightings respectively corresponding to the video elements, the portions of the time determined by said display weightings;

wherein a quantity of the interactive options is four, and wherein the video elements corresponding to the interactive segment are respectively displayed on the corresponding interactive options for the portions of the time of the duration of the interactive segment when a quantity of the video elements corresponding to the interactive segment is greater than four.

2. The interactive video transmitting device of claim 1, wherein the interactive options corresponding to one of the interactive segments forms a hierarchical menu, when one of the interactive options is triggered, a next layer of the interactive options corresponding to the color function keys is displayed.

3. The interactive video transmitting device of claim 1, wherein one of the commands is associated with an object displayed on the frame of the interactive segment, and the viewing end device storing a merchandise information corresponding to the object in a temporary area.

4. An interactive video transmitting device, comprising:
a processor;
a storing unit, electrically connected with the processor and storing a program code and a plurality of interactive videos, each of the interactive videos comprising a plurality of interactive segments respectively stored in the storing unit independently, each of the interactive segments respectively corresponding to a plurality of interactive options, a plurality of video elements and a plurality of display weightings; and
a communicating unit, electrically connected with the processor;
wherein the processor executes the program code to receive a control signal from a viewing end device, the control signal indicating a first interactive video of the interactive videos is selected, then the processor retrieving, and transmitting to the viewing end device through the communicating unit, the interactive segments of the first interactive video from the storing unit, as well as the corresponding interactive options, the corresponding video elements and the corresponding display weightings;
wherein when the viewing end device plays the interactive segment of the first interactive video, the interactive options corresponding to the interactive segment are displayed on the interactive segment, and the video elements corresponding to the interactive segment are respectively displayed on corresponding interactive options for portions of a time of a duration of the interactive segment, said display weightings respectively corresponding to the video elements, the portions of the time determined by said display weightings;
wherein a quantity of the interactive options is four, and wherein the video elements corresponding to the interactive segment are respectively displayed on the corresponding interactive options for the portions of the time of the duration of the interactive segment when a quantity of the video elements corresponding to the interactive segment is greater than four.

5. The interactive video transmitting device of claim 4, wherein each of the interactive videos respectively corresponds to a linear reference table stored in the storing unit, each of the linear reference tables comprising the interactive options, the video elements and the display weightings respectively corresponding to each of the interactive segments.

6. The interactive video transmitting device of claim 4, wherein the processor transmits the interactive segments of the first interactive video according to a linear segment playing sequence, and transmits the first interactive video and interactive videos subsequent to the first interactive video according to a linear video playing sequence.

7. The interactive video transmitting device of claim 4, wherein the processor receives a first control signal from the viewing end device through the communicating unit, the first control signal indicating that a first interactive option displaying a first video element is selected, said interactive options being displayed on a first interactive segment playing on the viewing end device or displayed on an interactive menu by the viewing end device, and the first video element corresponding to a certain visible object shown in the first interactive segment, the first interactive segment being one of the interactive segments of the first interactive video, and the first video element corresponding to a first video element identifier, the first interactive segment comprising a first interactive segment identifier, said interactive segments in the storing unit comprising at least a second interactive segment with a second interactive segment identifier, the first interactive segment identifier and the second interactive segment identifier being respectively associated with the first video element identifier, and according to the first video element identifier, the first interactive segment identifier and the second interactive segment identifier, the processor further retrieving and transmitting the first interactive segment and the second interactive segment for playing on the viewing end device.

8. The interactive video transmitting device of claim 7, wherein the processor further retrieves and transmits an increased first display weighting and an increased second display weighting associated with the first video element through the communicating unit, when the first interactive segment and the second interactive segment are played respectively on the viewing end device, the first video element being displayed respectively on the corresponding ones of said interactive options according to the first display weighting and the second display weighting.

9. The interactive video transmitting device of claim 8, wherein the processor further retrieves and transmits a third display weighting corresponding to the first interactive segment and a third video element through the communicating unit, the third video element and the first video element jointly corresponding to a same one of the interactive options of the first interactive segment, and the third display weighting being lower than the first display weighting.

10. The interactive video transmitting device of claim 4, wherein a quantity of the video elements corresponding to the interactive segment is greater than a quantity of the interactive options.

11. A viewing end device, comprising:
a processing unit;
a memory unit, electrically connected with the processing unit and storing a program code;
a network unit, electrically connected with the processing unit; and
an AV output unit, electrically connected with the processing unit;
wherein, the processing unit executes the program code for:
receiving a control signal and transmitting through the network unit to a transmitting device stored with a plurality of interactive videos, the control signal indicating that a first interactive video of said interactive videos is selected, and through the network unit, receiving a plurality of interactive segments of the first interactive video, as well as a plurality of interactive options, a plurality of video elements and a plurality of display weightings corresponding to the first interactive video; and when playing one of the interactive segments of the first interactive video through the AV output unit, displaying the interactive options corresponding to the in-play interactive segment on the interactive segment in play, and the video elements corresponding to the in-play interactive segment being displayed on the corresponding interactive options respectively for portions of a time duration of the in-play interactive segment, said display weightings respectively corresponding to the video elements, the portions of the time determined by said display weightings;

wherein a quantity of the interactive options is four, and wherein the video elements corresponding to the in-play interactive segment are respectively displayed on the corresponding interactive options for the portions of the time of the duration of the in-play interactive segment when a quantity of the video elements corresponding to the in-play interactive segment is greater than four.

12. The viewing end device of claim 11, wherein the processing unit receives a first control signal indicating that a first interactive option displaying a first video element is selected, wherein the first interactive option is one of said interactive options, said interactive options being displayed on a first interactive segment playing on the AV output unit or displayed on an interactive menu by the AV output unit, and the first video element corresponding to a certain visible object shown in the first interactive segment, the first interactive segment being one of the interactive segments of the first interactive video, and the first video element corresponding to a first video element identifier, the first interactive segment comprising a first interactive segment identifier, said interactive segments comprising at least a second interactive segment with a second interactive segment identifier, the first interactive segment identifier and the second interactive segment identifier being respectively associated with the first video element identifier, and the processing unit receiving the first interactive segment and the second interactive segment and playing on the AV output unit.

13. The viewing end device of claim 12, wherein the processing unit further receives an increased first display weighting and an increased second display weighting associated with the first video element through the network unit, when the first interactive segment and the second interactive segment are played respectively on the AV output unit, the first video element being displayed respectively on the corresponding ones of said interactive options according to the first display weighting and the second display weighting.

14. The viewing end device of claim 13, wherein the processing unit further receives a third display weighting corresponding to the first interactive segment and a third video element through the network unit, the third video element and the first video element jointly corresponding to a same one of the interactive options of the first interactive segment, and the third display weighting being lower than the first display weighting.

15. An interactive video transmitting method, comprising: by an interactive video transmitting device having a processor, a storing unit electrically connected with the processor and storing a program code and a plurality of interactive videos, each of the interactive videos comprising a plurality of interactive segments respectively stored in the storing unit independently, each of the interactive segments respectively corresponding to a plurality of interactive options, a plurality of video elements and a plurality of display weightings, and a communicating unit, electrically connected with the processor, by the processor, executing the program code to receive a control signal from a viewing end device, the control signal indicating a first interactive video of the interactive videos is selected, and retrieving, and transmitting to the viewing end device through the communicating unit, the interactive segments of the first interactive video from the storing unit, as well as the corresponding interactive options, the corresponding video elements and the corresponding display weightings, wherein when the viewing end device plays the interactive segment of the first interactive video, the interactive options corresponding to the interactive segment are displayed on the interactive segment, and the video elements corresponding to the interactive segment are respectively displayed on corresponding interactive options for portions of a time of a duration of the interactive segment, said display weightings respectively corresponding to the video elements, the portions of the time determined by said display weightings;

wherein a quantity of the interactive options is four, and wherein the video elements corresponding to the interactive segment are respectively displayed on the corresponding interactive options for the portions of the time of the duration of the interactive segment when a quantity of the video elements corresponding to the interactive segment is greater than four, receiving a control signal from the viewing end device indicating that a first interactive option displaying a first video element is selected, wherein the first interactive option is one of the plurality of interactive options, said interactive options being displayed on a first interactive segment in play or displayed on an interactive menu, and the first video element corresponding to a certain visible object shown in the first interactive segment, the first interactive segment being one of the plurality of interactive segments of the plurality of interactive videos, wherein the first video element corresponds to a first video element identifier, the first interactive segment comprising a first interactive segment identifier, said interactive segments comprising a second interactive segment with a second interactive segment identifier, the first interactive segment identifier and the second interactive segment identifier being respectively associated with the first video element identifier; and according to the first video element identifier, the first interactive segment identifier and the second interactive segment identifier, the processor further retrieving and transmitting the first interactive segment and the second interactive segment for playing on the viewing end device.

16. The interactive video transmitting method of claim 15, wherein each of the interactive videos respectively corresponds to a linear reference table, each of the linear reference tables comprising the interactive options, the plurality of video elements and the plurality of display weightings respectively corresponding to each of the interactive segments.

17. The interactive video transmitting method of claim 15 further comprising retrieving and transmitting an increased first display weighting and an increased second display weighting associated with the first video element, when the first interactive segment and the second interactive segment are played respectively on the viewing end device, the first video element being displayed respectively on the corresponding ones of said interactive options according to the first display weighting and the second display weighting.

18. The interactive video transmitting method of claim 15 further comprising retrieving and transmitting a third display weighting corresponding to the first interactive segment and a third video element, the third video element and the first video element jointly corresponding to a same one of the interactive options of the first interactive segment, and the third display weighting being lower than the first display weighting.

19. An interactive video playing method, comprising:
receiving and transmitting a control signal to an interactive transmitting device having a processor, a storing unit electrically connected with the processor and storing a program code and a plurality of interactive videos, each of the interactive videos comprising a plurality of interactive segments respectively stored in the storing unit independently, each of the interactive segments respectively corresponding to a plurality of interactive options, a plurality of video elements and a plurality of display weightings, and a communicating unit, electrically connected with the processor,
by the processor,
executing the program code to receive a control signal from a viewing end device, the control signal indicating a first interactive video of the interactive videos is selected, and
retrieving, and transmitting to the viewing end device through the communicating unit, the interactive segments of the first interactive video from the storing unit, as well as the corresponding interactive options, the corresponding video elements and the corresponding display weightings, and
wherein when the viewing end device plays the interactive segment of the first interactive video, the interactive options corresponding to the interactive segment are displayed on the interactive segment, and the video elements corresponding to the interactive segment are respectively displayed on corresponding interactive options for portions of a time of a duration of the interactive segment, said display weightings respectively corresponding to the video elements, the portions of the time determined by said display weightings;
wherein a quantity of the interactive options is four, and
wherein the video elements corresponding to the interactive segment are respectively displayed on the corresponding interactive options for the portions of the time of the duration of the interactive segment when a quantity of the video elements corresponding to the interactive segment is greater than four,
the control signal further indicating that a first interactive option displaying a first video element is selected, wherein the first interactive option is one of the plurality of interactive options, said interactive options being displayed on a first interactive segment in play or displayed on an interactive menu, and the first video element corresponding to a certain visible object shown in the first interactive segment, the first interactive segment being one of the plurality of interactive segments of the plurality of interactive videos, wherein the first video element corresponds to a first video element identifier, the first interactive segment comprising a first interactive segment identifier, said interactive segments comprising at least a second interactive segment with a second interactive segment identifier, the first interactive segment identifier and the second interactive segment identifier being respectively associated with the first video element identifier; and
receiving and playing the first interactive segment and the second interactive segment on the viewing end device.

20. The interactive video playing method of claim 19 further comprising receiving an increased first display weighting and an increased second display weighting associated with the first video element, when the first interactive segment and the second interactive segment are displayed respectively on the viewing end device, the first video element being displayed respectively on the corresponding ones of said interactive options according to the first display weighting and the second display weighting.

21. The interactive video playing method of claim 20 further comprising receiving a third display weighting corresponding to the first interactive segment and a third video element through the network unit, the third video element and the first video element jointly corresponding to a same one of the interactive options of the first interactive segment, and the third display weighting being lower than the first display weighting.

* * * * *